US008081726B2

(12) United States Patent
Bickel et al.

(10) Patent No.: US 8,081,726 B2
(45) Date of Patent: Dec. 20, 2011

(54) METHOD AND APPARATUS FOR SYNCHRONIZING DATA IN UTILITY SYSTEM

(75) Inventors: Jon A. Bickel, Murfreesboro, TN (US); E. Avery Ashby, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 1184 days.

(21) Appl. No.: 11/801,503

(22) Filed: May 10, 2007

(65) Prior Publication Data

US 2008/0279321 A1    Nov. 13, 2008

(51) Int. Cl.
*H04L 7/00* (2006.01)
(52) U.S. Cl. .................. 375/364; 375/354; 375/356
(58) Field of Classification Search .............. 375/356, 375/35, 364
See application file for complete search history.

(56) References Cited

U.S. PATENT DOCUMENTS

| | | | |
|---|---|---|---|
| 4,855,671 A | 8/1989 | Fernandes | |
| 5,903,594 A | 5/1999 | Saulnier et al. | |
| 6,088,659 A | 7/2000 | Kelley et al. | |
| 6,094,650 A | 7/2000 | Stoffel et al. | |
| 6,567,663 B1 * | 5/2003 | Otting et al. | 455/434 |
| 2003/0014678 A1 | 1/2003 | Ozcetin et al. | |
| 2003/0222509 A1 | 12/2003 | Andarawis et al. | 307/139 |
| 2004/0225649 A1 | 11/2004 | Yeo et al. | |
| 2005/0017847 A1 | 1/2005 | Bonicatto et al. | |
| 2005/0050095 A1 | 3/2005 | Hurtis et al. | |
| 2007/0005275 A1 | 1/2007 | Bickel et al. | |

FOREIGN PATENT DOCUMENTS

| | | |
|---|---|---|
| GB | 2 220 753 | 5/1988 |
| WO | WO 00/65480 | 2/2000 |
| WO | WO 2005/059572 | 6/2005 |

OTHER PUBLICATIONS

Article: Cross Correlation—Auto Correlation—2D Pattern Identification by Paul Bourke (Aug. 1996) 11 pages.
Article: The Need For Speed by Richard P. Bingham, Dranetz-BMI (undated) 12 pages.
Article: GPS World—Pacify the Power GPS Harness for Large-Area Electrical Grid by Dennis Erickson and Carson Taylor (Apr. 1, 2005) 9 pages.
Article: Protection, Control, Reliability and Diagnostic Improvements via Single-Processor Control of Circuit Breakers in Low Voltage Switchgear © 2005, IEEE; 10 pages.

(Continued)

*Primary Examiner* — Shuwang Liu
*Assistant Examiner* — Michael Neff

(57) ABSTRACT

A time synchronization device (TSD) that produces a synchronization signal and couples it onto energized power conductors in a power monitoring system. Monitoring devices coupled to the TSD include frequency detection algorithms, such as a Goertzel filter, for detecting the synchronization signal and interpreting the information encoded in the signal. The frequency of the synchronization signal may correspond to the fourth or tenth harmonic component of the fundamental frequency of the voltage on the power conductors. The magnitude of the signal is selected to be above the expected or established noise floor of the power monitoring system plus a predetermined threshold. The duration of the signal can be varied, such as lasting a full cycle of the fundamental frequency. Multiple TSD signals received in a predetermined sequence may be converted into digital words that convey time, configuration, reset, control, or other information to the monitoring device.

18 Claims, 16 Drawing Sheets

OTHER PUBLICATIONS

Article: Innovation to Reality—Introducing State-of-the-Art Protection and Monitoring to Existing Low-Voltage Switchgear © 2005, IEEE; 11 pages.
Article: Re: Thinking Switchgear—The Difference Entellisys™ Makes For You; date unknown; 16 pages.
PCT Written Opinion for International Application No. PCT/US2006/025444, dated Oct. 10, 2006 (9 pages).
PCT Search Report for International Application No. PCT/US2006/025444, dated Oct. 10, 2006 (6 pages).
Ren C. Luo et al., "Automated Decision Tree Generation For Object Recognition And Classification" Proceedings Of The International Conference on Industrial Electronics, Control and Instrumentation (IECON). Industrial Applications of Mini, Micro and Personal Computers, Document No. XP-0020568809, dated Sep. 29, 1986 pp. 357-362.
PCT Written Opinion for International Application No. PCT/US2006/025445, dated Nov. 24, 2006 (7 pages).
PCT Search Report for International Application No. PCT/US2006/025445, dated Nov. 24, 2006 (3 pages).
Article: The Need For Speed by Richard P. Bingham, Dranetz-BMI, Nov. 1999, 12 pages.
Motorola Digital Dna; Freescale Semiconductor, Inc. "Konnex PL132 Over Power Line Based on the M68HC08—Demo Application Designer reference Manual" M68HC08 Microcontrollers (164pages); dated 2003.
Written Opinion corresponding to co-pending International Patent Application Serial No. PCT/US2008/005634, European Patent Office, dated Oct. 17, 2008, 8 pages.
International Search Report corresponding to co-pending International Patent Application Serial No. PCT/US2008/005634, European Patent Office, dated Oct. 17, 2008, 6 pages.

* cited by examiner

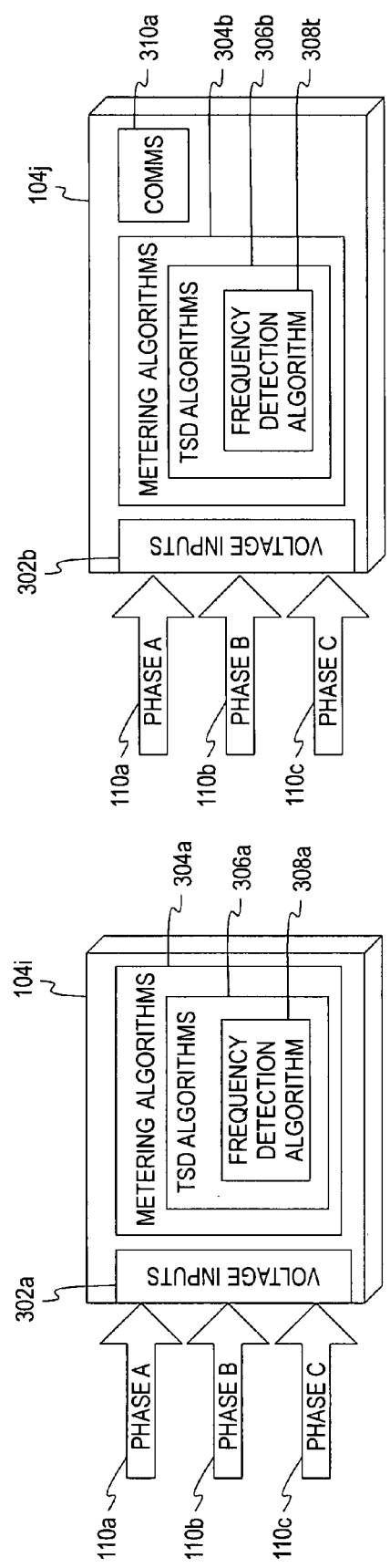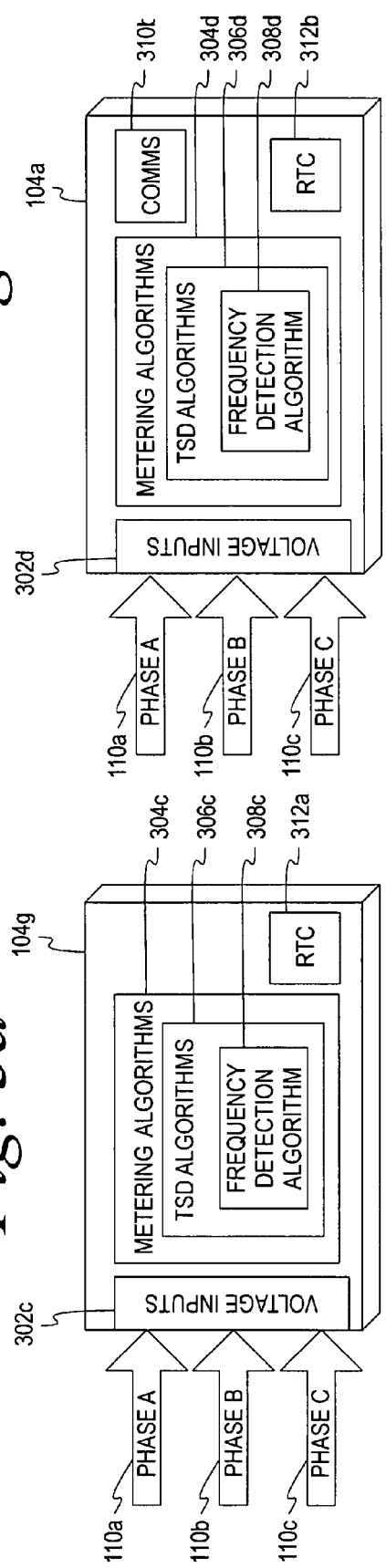

METHOD AND APPARATUS FOR SYNCHRONIZING DATA IN UTILITY SYSTEM

FIELD OF THE INVENTION

The present invention relates generally to utility systems, and, in particular, to a method and apparatus for synchronizing data in a utility system.

BACKGROUND OF THE INVENTION

Data acquisition from an electrical power system helps and operator understand how energy is being consumed by the power system. However, measured data is scalar without the context of when the measured data was actually captured. Ideally, time would be uniform and fixed across the power system, but time is not homogeneous in practical applications. Time is a relative concept that is subject to different variables such as the location, accuracy, and precision of a clock. Because of these and other intrinsic complications, a simple timestamp is often insufficient to precisely describe the temporal moment when a given data point was captured. This problem becomes readily apparent in power monitoring systems, especially as more monitoring devices are incorporated into the power system.

Aligning the magnitude and occurrence of electrical data (voltage, current, energy, demand, events, time, etc.) received from monitoring devices is a valuable tool for end-users. It is difficult to align two or more monitoring device's data together although these devices may record data simultaneously. The end-user must align events on the power system manually by analyzing the data received from the monitoring devices and interpreting that data. In such a case, it can be difficult to even align events or data that occur on different days, much less the same day.

One technique for temporally aligning data across a power monitoring system employs a global positioning satellite (GPS) time system. GPS time systems provide monitoring devices with a synchronized clock signal that insures all power system device clocks are set to the same value. Such GPS systems are expensive because end-users must purchase and install additional hardware and data lines to link each device together and/or to the GPS time signal. Power system devices must be capable of recognizing, receiving, and acting upon the GPS time system's protocol accordingly. Power system devices that do not employ an on-board clock do not have a reference that can be "adjusted" by the GPS time system, and GPS time systems are useless in this case. In certain configurations, latencies may be introduced into the hardware associated with processing time delays. Also, the loss of the time synchronization signal anywhere between the GPS satellite and the monitoring device can result in the loss of synchronization across the power monitoring system.

What is needed, therefore, is a more robust and less expensive system and method for synchronizing data in a utility system. Aspects of the present invention address these and other needs.

SUMMARY OF THE INVENTION

Briefly, according to an embodiment of the present invention, a system for synchronizing a plurality of monitoring devices in a utility monitoring system to a common time reference includes a time synchronization device that includes a reference clock, a signal generator, and a controller programmed to cause the signal generator to generate a synchronization signal at periodic time intervals that are synchronized with the reference clock, the signal generator coupling the synchronization signal over an energized power conductor; and a monitoring device coupled to the power conductor and including a controller coupled to a memory, the controller of the monitoring device being programmed to detect at least one characteristic of the synchronization signal and, in response thereto, to store data in the memory indicative of the detection of the synchronization signal. The monitoring device may be a power meter and may further include a cycle counter that counts the number of cycles of the electrical voltage or current on the power conductor, the cycle counter incrementing a value in the memory, the data being set to a predetermined value in response to the detection of the synchronization signal.

According to other aspects, the at least one characteristic may be at least one of a fundamental frequency, a magnitude, a phase, or a duration. The signal generator may be operable to generate the synchronization signal and a second synchronization signal having a set of characteristics in which at least one characteristic of the set of characteristics differs from the at least one characteristic of the synchronization signal. The fundamental frequency of the synchronization signal may correspond to a harmonic or interharmonic frequency component of the fundamental frequency of the electrical voltage or current.

The monitoring device may further include a communications interface communicatively coupled to a remote system, the monitoring device storing in the memory characteristic data indicative of an electrical characteristic, the monitoring device synchronizing the characteristic data with the synchronization signal and transmitting the characteristic data to the remote system via the communications interface. The reference clock may be generated from a calendar clock onboard the time synchronization device or from an external global positioning system.

The monitoring device may be a power meter and may further include a cycle counter that counts the number of cycles of the electrical voltage or current on the power conductor, wherein the data indicative of the detection of the synchronization signal includes a time associated with the detection of the synchronization signal and the cycle count associated with the detection of the synchronization signal. The synchronization signal may include a plurality of pulses, the monitoring device converting the plurality of pulses to a corresponding digital word indicative of at least a control function, a reset function, a configuration function, or a utility demand interval function. The control function may include at least one of an instruction that causes a load coupled to the monitoring device to be turned on or off, or an instruction that causes an actuator a circuit breaker coupled to the monitoring device to change states. The reset function may include at least one of an instruction to adjust a counter or value related to an electrical characteristic or an instruction to reset the monitoring device. The configuration function may include an instruction to configure a parameter of the monitoring device, the parameter including a value indicative of the at least one characteristic of the synchronization signal. The utility demand interval function may include an instruction to increment or reset a utility demand interval counter.

According to other embodiments of the present invention, a method of communicating a synchronization signal that is interpreted simultaneously by a plurality of monitoring devices in a power monitoring system includes: generating a synchronization signal having at least a magnitude and a duration; coupling the synchronization signal via power line communication onto one or more power conductors to which the plurality of monitoring devices are coupled at periodic time intervals that are determined by a reference clock external to the plurality of monitoring devices; receiving, simultaneously at each of the plurality of monitoring devices, the synchronization signal; detecting at least one of the magnitude or the duration of the synchronization signal; and responsive to the detecting, storing data in memory indicative of the detection of the synchronization signal.

According to other aspects of the present invention, the detecting may include filtering the synchronization signal at a harmonic (or interharmonic) component of the fundamental frequency of the voltage or current in the one or more power conductors. The method may further include encoding in the synchronization signal at least one of control information, reset information, configuration information, or utility demand interval information, the synchronization signal comprising a plurality of pulses transmitted in a sequence that is decoded and converted into a corresponding digital word by each of the plurality of monitoring devices. The storing may include adjusting an on-board clock in at least one of the plurality of monitoring devices to be synchronized with the reference clock.

The method may further include counting, in at least one of the plurality of monitoring devices, the number of peaks in the voltage or current in the one or more power conductors and storing the number of peaks in a cycle count counter on the at least one of the plurality of monitoring devices, wherein the storing includes resetting the cycle count counter. The method may further include determining, in at least one of the plurality of monitoring devices, an outage time based on the number of peaks actually counted by the at least one of the plurality of monitoring devices during a time interval between two consecutive synchronization signals and on the number of expected peaks that should have been counted during the time interval.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIGS. 3a-d correspond to functional block diagrams of various monitoring devices having various capabilities including communications and on-board clock capabilities according to aspects of the present invention;

Figure 1:
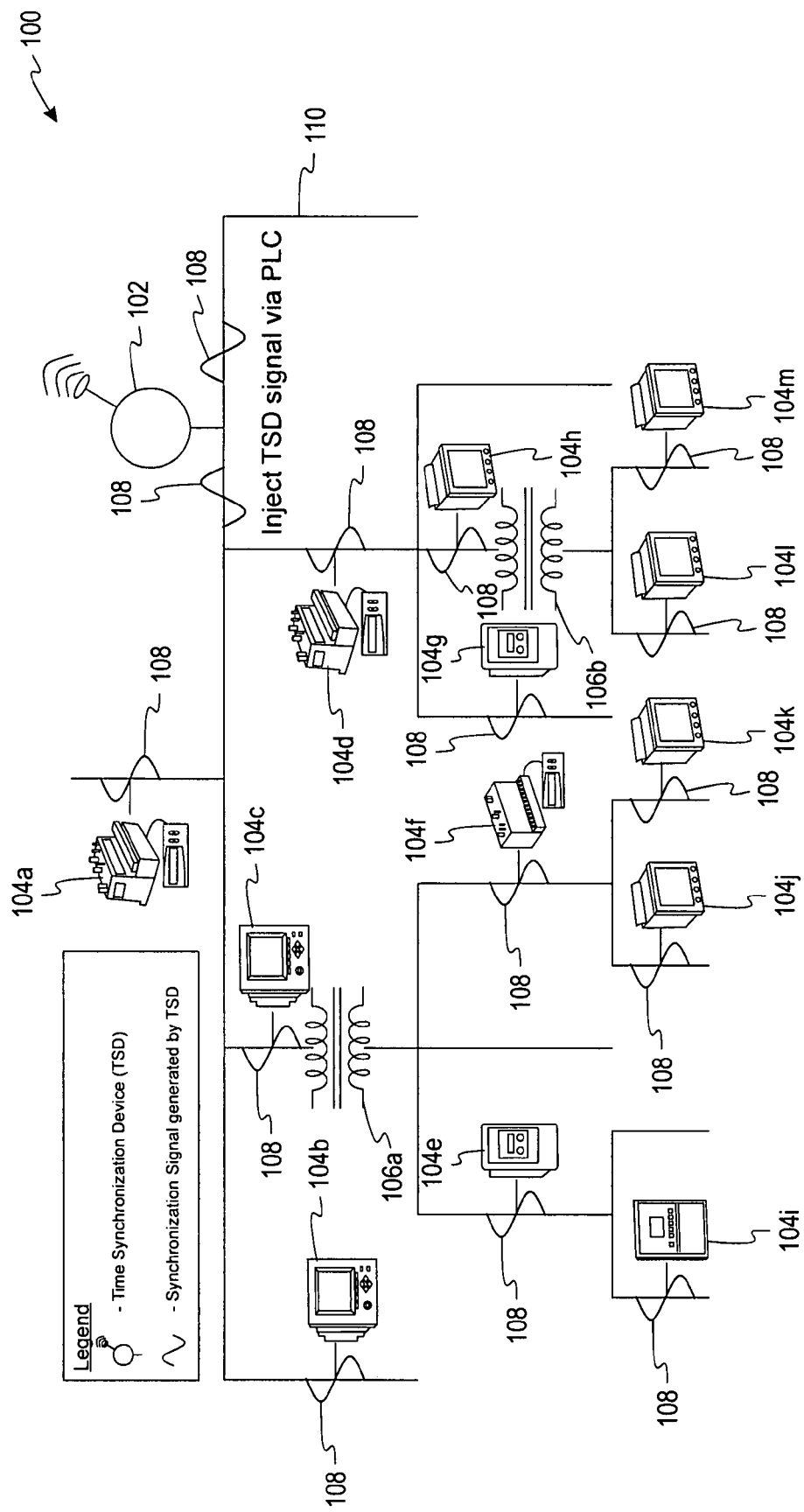
FIG. 1 illustrates a functional block diagram of an exemplary power monitoring system that includes a time synchronization device (TSD) according to aspects of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Aspects of the present invention not only enhance existing data alignment capabilities in meters, but also implement time-keeping/time-stamping on metering devices that lack an on-board clock. Furthermore, aspects of this invention provide a method of time-keeping/time-stamping for monitoring devices that lack an on-board clock. Aspects of the present invention allow monitoring devices of varying capabilities to all be aligned to a common time reference. For example, some monitoring devices may lack both external communications capability and an on-board clock. Other monitoring devices may have one or both such capabilities. A monitoring device is a device having the ability to sample, collect, or measure the operational characteristics of a utility system.

An important aspect of the present invention is a novel time synchronization device, or "TSD," which in general, couples onto the power distribution conductors a synchronization signal (also referred to herein as a "TSD signal") at periodic intervals, which is received by the monitoring devices in the power monitoring system, which in turn synchronize their data to the common time reference. At least the following functions can be accomplished in monitoring devices having the following capabilities.

1. Monitoring devices without timekeeping or communications capabilities:

a. Time of day
b. Time of use
c. Shift energy
d. Number of 9s (refers to an assessment of reliability, expressed as a percentage over some period of time, e.g., 99.99% reliability has four nines)
e. Load times (e.g., how long the monitoring device has been operating)
f. Date/time-stamping of events
g. Number of disturbances
h. Total disturbance time
i. Timekeeping and synchronization for all meters (including Daylight Savings Time or DST)

2. Monitoring devices without timekeeping capabilities, but with communications capabilities:

a. Time of day
b. Time of use
c. Shift energy
d. Number of 9s
e. Load times

-continued

| | |
|---|---|
| f. | Date/time-stamping of events |
| g. | Number of disturbances |
| h. | Total disturbance time |
| i. | Timekeeping and synchronization for all meters (including DST) |
| j. | Alignment of data between meters using cycle counts |
| k. | Clock synchronized by synchronization signals and cycle counts |
| l. | Time error correction based on synchronization signals and cycle counts |
| m. | Time redundancy (software, SNTP/NTP, TSD, etc.) |

3. Monitoring devices with timekeeping capabilities, but without communications capabilities:

| | |
|---|---|
| a. | Time of day |
| b. | Time of use |
| c. | Shift energy |
| d. | Number of 9s |
| e. | Load times |
| f. | Date/time-stamping of events |
| g. | Number of disturbances |
| h. | Total disturbance time redundancy |
| i. | Time synchronization for all meters (including DST) |
| j. | Time redundancy (software, SNTP/NTP, TSD, GPS, etc.) |
| k. | Time error correction for on-board clock based on synchronization signals and cycle counts |

4. Monitoring devices with both timekeeping and communications capabilities:

| | |
|---|---|
| a. | Time of day |
| b. | Time of use |
| c. | Shift energy |
| d. | Number of 9s |
| e. | Load times |
| f. | Date/time-stamping of events |
| g. | Number of disturbances |
| h. | Total disturbance time redundancy |
| i. | Time synchronization for all meters (including DST) |
| j. | Alignment of data between meters based on cycle counts |
| k. | Clock synchronized by synchronization signals and cycle counts |
| l. | Time error correction based on synchronization signals and cycle counts |
| m. | Time redundancy (software, SNTP/NTP, TSD, GPS, etc.) |
| n. | Time error correction for on-board clock based on synchronization signals and cycle counts |
| o. | Minimize effects of hardware processing time delays. |

Aligning the electrical data captured by the monitoring devices to a common time reference, coupled with knowledge of the power system hierarchy, provides the end-user with the basic requirements for many types of sophisticated data analysis. This information can be analyzed to troubleshoot problems, increase equipment and system performance, improve safety, and save money.

Referring now to FIG. 1, there is shown a power system 100 comprising a time synchronization device (TSD) 102 and a plurality of monitoring devices 104a-m coupled together by power conductors 110. The power system 100 also includes transformers 106a, 106b, which are commonly found in existing power systems. The TSD, as will be explained in more detail below, couples onto the power conductors 110a synchronization signal 108 at a predetermined frequency that is preferably higher than the fundamental or nominal frequency of the power system 110.

The TSD 102 is a discrete device that manages and generates synchronization signals to all capable monitoring devices (i.e., monitoring devices configured to interpret the synchronization signal) on the power monitoring system 100. The TSD 102 can be configured (in conjunction with the monitoring device 104 firmware) to perform a number of functions including configuration functions, reset functions, control functions, time/occurrences functions, demand interval functions, and so forth.

Figure 2A:
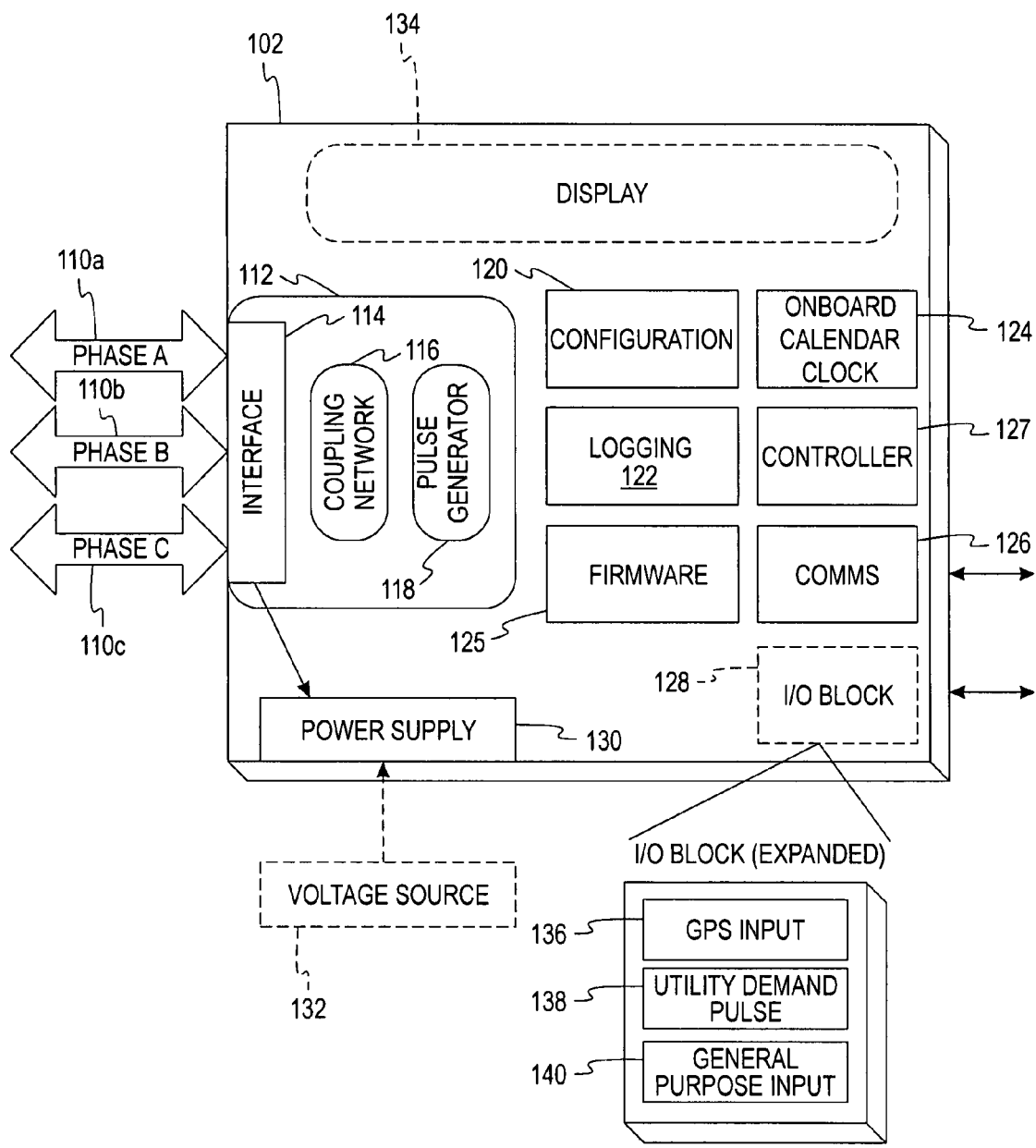
FIG. 2a illustrates a functional block diagram of a TSD with optional components according to aspects of the present invention.

FIG. 2a illustrates a functional block diagram of the TSD 102. The TSD 102 includes a signal generation circuit 112, a configuration module 120, which may be stored in a memory on the TSD, a logging module 122, which may also be stored on the TSD memory, an on-board calendar clock 124, a communications interface 126 for communicating to systems external to the TSD 102, an I/O block 128 for I/O functionality, an on-board power supply 130, and an optional display 134. Alternately, instead of being powered from a voltage source 132, the TSD 102 can be energized from a phase conductor or conductors 110.

The signal generation circuit 112 includes an interface 114 for receiving three phase conductors 110a-c in this example, a coupling network 116, and a pulse generator 118. The signal generation circuit 112 is shown in more detail in FIG. 2b. The I/O block 128 may include various input or output components, and a few exemplary components are shown in the expanded block diagram in FIG. 2a. For example, a GPS input 136 may be provided to the TSD 102, which supplies a reference clock from a GPS source. A utility demand pulse signal 138 may be received as an input to the TSD 102 from a utility source. A general purpose input 140 may also be provided to the TSD 102 for receiving inputs for configuring the configuration module 120 of the TSD 102, for synchronizing the calendar clock 124, for adjusting a characteristic of the synchronization signal transmitted by the TSD 102, and the like. Configuration, time, status, and other information can be displayed on the optional display 134. The TSD 102 may include one or both of the on-board clock 124 and the I/O block 128. Reference time may be supplied by the on-board clock 124 or by an external input to the I/O block 128, which provides a reference time, or via the communications interface 126.

The on-board calendar clock 124 provides a common reference time that can be adjusted by an external input received by the I/O block or via the communications interface 126. For example, the on-board calendar clock 124 can be synchronized via an NTP or SNTP (simple network time) protocol or via an external GPS system to an IRIG-B input. Other sources of the reference time may be provided by monitoring system's software, a power monitoring device, such as any of the devices 104, and so forth.

The configuration module 120 configures the characteristics of the synchronization or TSD signal 108 that is transmitted over the power conductors 110 via the interface 114 of the TSD 102. For example, the configuration module 120 can configure any one or more of the frequency, magnitude, phase, and duration of the synchronization signal 108. The configuration module 120 also configures the periodicity (e.g., every hour) at which the synchronization signal 108 is transmitted to the monitoring devices 104. The configuration module 120 also configures how the on-board calendar clock 124 is externally synchronized, if at all. For example, periodically, the configuration module 120 may compare the time reported by the on-board calendar clock with an external time reference received via the SNTP protocol or via a GPS system, for example, and adjust the on-board calendar clock when a discrepancy is found.

The logging module 122 logs various occurrences, including the time a synchronization pulse 108 was transmitted, and the content of the information encoded in the synchronization pulse 108. For example, the synchronization pulse 108 may include time synchronization information, control information, configuration information, demand interval information, or reset information.

The configuration module 120 and the logging module 122 may be comprised of machine-readable instructions executable by a controller 127 of the TSD 102 and stored as software or firmware 125 in the TSD 102.

Figure 2B:
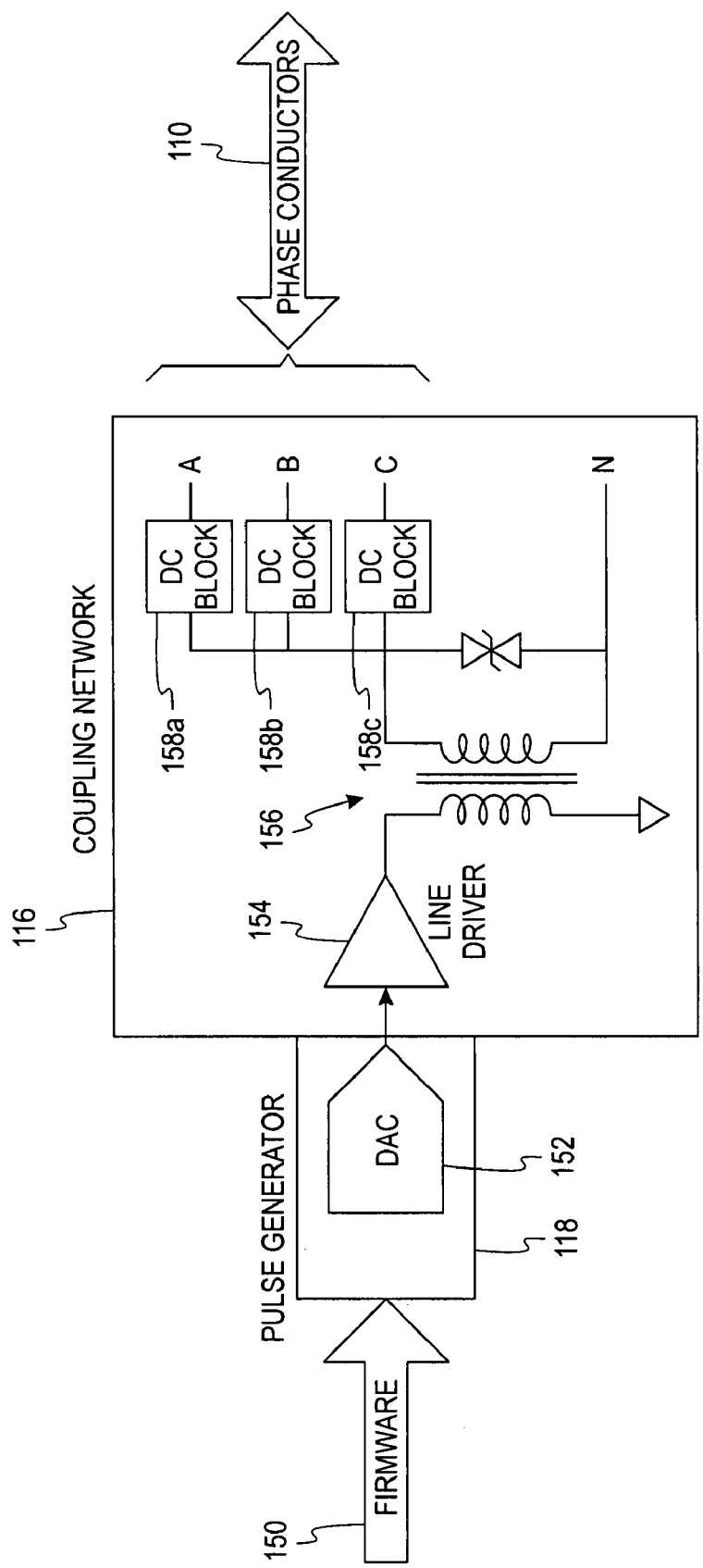
FIG. 2b illustrates a functional block diagram of a signal generator and coupling network incorporated into the TSD according to aspects of the present invention.

FIG. 2b illustrates a block diagram of an exemplary signal generation circuit 112. The pulse generator 118 includes a digital-to-analog converter (DAC) 152, which converts digital signals received from firmware 150 to corresponding analog signals. For example, the digital signals encode the frequency, magnitude, and duration of the synchronization signal 108, which are converted into corresponding analog signals and provided to a line driver 154 of the coupling network 116. The output of the line driver 154 is connected to a coupling transformer 156, which produces an analog sinusoidal signal having a frequency, magnitude, and duration. DC blocks 158a-c ensure the coupling transformer 156 does not saturate due to DC components in the phase conductors 110.

In lieu of the DAC 152, the pulse generator 118 may be implemented with a PWM (pulse-width modulator) and a filter tuned to the frequency of the synchronization signal 108.

Based on its configured function, the TSD 102 will generate a synchronization signal 108 at a predetermined frequency or frequencies, having a magnitude, and a duration. Preferably, the frequency of the synchronization signal 108 is a harmonic component, though it may also be an interharmonic frequency. For example, the fourth and tenth harmonic components of the fundamental frequency are not typically prevalent in a power monitoring system. Therefore, it may be desirable to select these harmonic components to carry the synchronization signal 108 as there would be minimal or no risk of misjudging the synchronization signal for a perturbation or steady-state occurrence on the power system 100. If the power system 100 is operating at 50 Hz or 60 Hz, then the fourth harmonic component would be 200 Hz or 240 Hz, respectively. It is desirable to avoid triplen frequencies that are inherently filtered by some transformer configurations (such as the transformers 106) including delta configurations. The synchronization signal 108 is a form of power-line communication (PLC) (in the case where the signal 108 is composed of a single frequency or multiple frequencies).

The magnitude of the synchronization signal 108 is preferably above the noise floor that is present in the power system 100 at the chosen frequency of the synchronization signal 108. Once the noise floor for the power system 100 is determined, the magnitude of the synchronization signal 108 is selected to be above the determined noise floor plus a tolerance.

The width or duration of the synchronization signal 108 is preferably one full cycle of the fundamental signal, which may be oscillating at 50 or 60 Hz. Thus, in an implementation, the width of the synchronization signal 108 is about 1/60 seconds. If the frequency of the synchronization signal 108 is equal to the fourth harmonic frequency of the fundamental frequency, then the synchronization signal 108 includes four cycles during one full cycle of the fundamental frequency. Those skilled in the art will appreciate that the pulse width or duration can be varied, and different pulse durations can be distinguished by the receiving monitoring device 104. Likewise, the pulse magnitude can also be varied and distinguished by the receiving monitoring device 104.

The TSD 102 tracks time (based on the configured input source) and cycle counts over a period with respect to the configured input time source, and may be configured to generate the synchronization signal 108 with respect to either time or cycle counts. In this respect, the monitoring devices 104 need not have on-board clocks to synchronize their data with respect to a common time reference.

The synchronization signals 108 generated by TSD 102 are tailored to their intended purpose or interval. For example, the end-user may want to generate one synchronization signal to indicate a 24-hour period has occurred and another synchronization signal to indicate a 1-hour period occurred. Each synchronization signal would be unique in that the metering device would be capable of distinguishing the difference between the two signals and respond accordingly. For example, the magnitude, frequency, phase, and/or duration of the synchronization signal 108 can be varied to differentiate between a 1-hour period versus a 24-hour period. This implementation allows monitoring devices without on-board clocks to have improved resolution over just a single form of synchronization signal.

Figure 4:
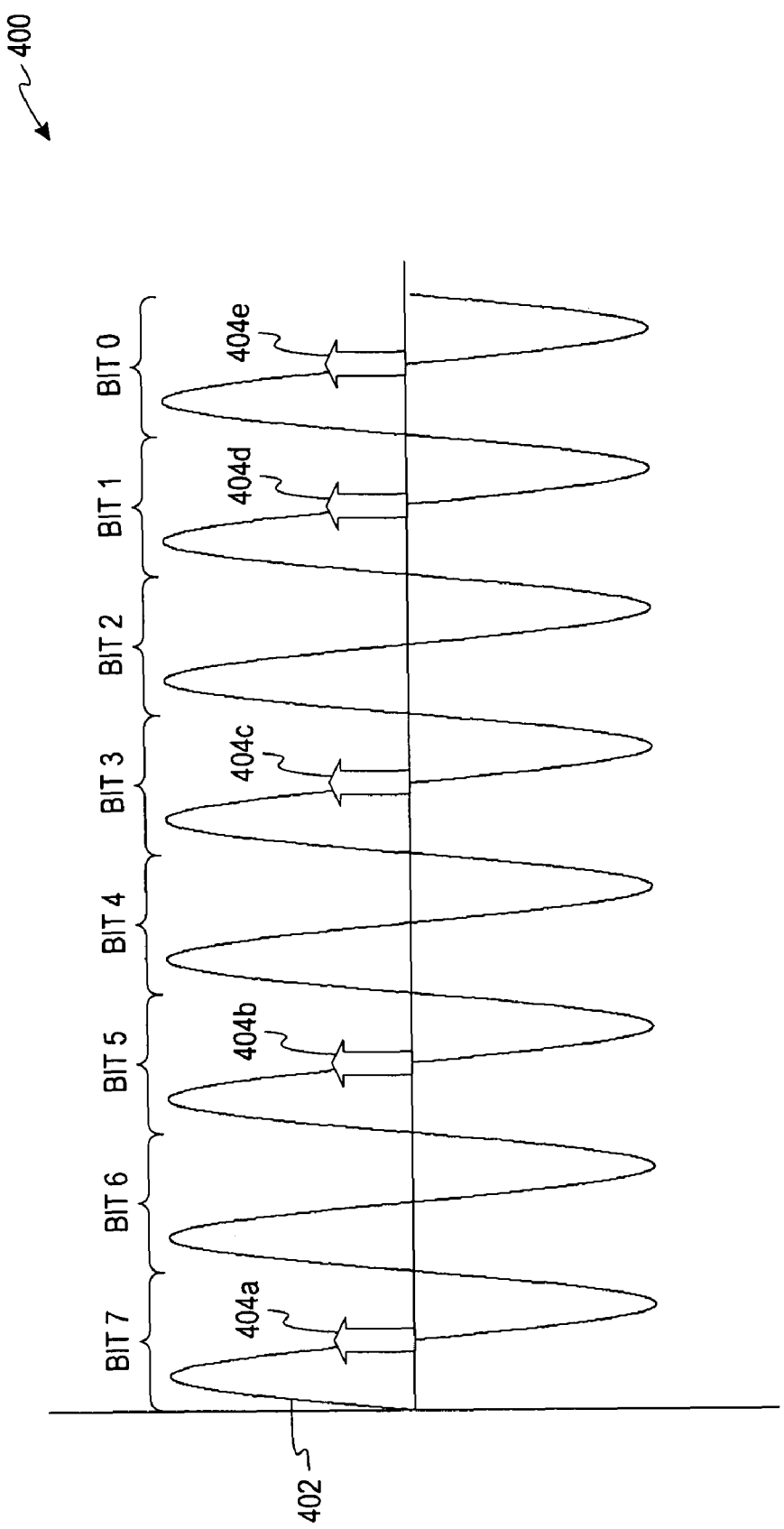
FIG. 4 illustrates an exemplary fundamental waveform with synchronization signals injected at 180 degrees phase at various cycles, which are converted to an 8-bit digital word by a monitoring device according to a specific aspect of the present invention.

Each synchronization or TSD signal 108 generated by the TSD 102 may incorporate multiple pulses that provide the monitoring device 104 with additional information. FIG. 4 illustrates five discrete pulses 404a-c (at some frequency or frequencies, such as the fourth or tenth harmonic frequency of the fundamental frequency) where the first pulse (bit 0) may indicate top of the hour and the remaining bits may indicate the specific hour, day, month, and year (eight bits are represented in FIG. 4, but it should be understood that any number of bits may be represented). The presence of a pulse at 180 degrees phase may indicate a logical one. The absence of a pulse at 180 degrees phase may indicate a logical zero. The first pulse 404e received by the monitoring device 104 is a synchronization pulse that informs the monitoring device 104 of a reference time, such as the start of a new 24-hour cycle. Monitoring devices 104 without timekeeping/time-stamping capabilities may set their respective time registers and increment their respective cycle count counters accordingly based on the metered cycle count. These pulses may provide other information to the monitoring devices 104 based on the configuration of the TSD 102 and each specific monitoring device 104.

It should be noted that the pulses 404a-e are shown diagrammatically in FIG. 4. Those skilled in the art will appreciate that the pulses 404a-e may comprise multiple peaks and have a sinusoidal waveform. Alternately, the pulses 404a-e may have a generally DC waveform. The width of the pulses 404a-e are illustrative only, and may be longer, such as lasting a full cycle of the fundamental frequency.

FIGS. 3a-d are functional block illustrations of various monitoring devices 104 that can receive and interpret the synchronization signal 108 in accordance with aspects of the present invention. Each monitoring device 104 includes a frequency detection algorithm 308 that is part of a TSD algorithm 306. Metering algorithms 304 in the monitoring device include the TSD algorithm 306 and modules for detecting, collecting, and optionally communicating to an external system electrical characteristics (e.g., voltage, current, power, energy, harmonic frequency, and the like) of electrical data being monitored by the monitoring device 104. The external system may include a computer or server running monitoring system software for interpreting the electrical data and generating reports.

Each of the monitoring devices 104 shown in FIGS. 3a-d receive from respective voltage inputs 302a-d each (or a subset) of the phase conductors 110a-c. Though three phase conductors 110a-c are shown, it is understood that any number of conductors may be received by the monitoring devices 104 as determined by the power system 100 requirements. For example, there may only be a line and a neutral conductor in some embodiments. The synchronization signal 108 is present on any one or combination of the phase conductors 110a-c, which are received at respective voltage inputs 302a-d and converted into digital signals representing the analog waveforms of the voltage or current signals present on the phase conductors 110a-c.

In FIG. 3a, the monitoring device 104i lacks external communications capability and also lacks an on-board clock. This monitoring device 104i represents the most "basic" monitoring device that may be present on the power system 100. Nevertheless, though it lacks any ability to communicate externally or to keep track of time, aspects of the present invention provide a solution for synchronizing such a monitoring device 104i with every other capable monitoring device 104 on the power system 100 and for keeping track of time in a "clockless" monitoring device.

FIG. 3b illustrates a functional block diagram of a monitoring device 104j that includes a communications module 310a but not an on-board clock. Monitoring device 104g, shown in FIG. 3c, includes an on-board clock 312a (labeled RTC, which means "real-time clock") but lacks a communications module for communicating with systems external to the monitoring device 104g. Finally, the monitoring device 104a shown in FIG. 3d includes both a communications module 310b and an on-board clock 312b.

By "capable monitoring device," it is meant that the monitoring device has the ability to detect and interpret the synchronization signals 108 from the TSD 102. To do so, each monitoring device 104 must include software or firmware corresponding to the frequency detection algorithms 308a-d, which is programmed to detect and interpret the synchronization signals 108. These aspects are described in more detail below. Note that the frequency detection algorithms 308a-d may vary from monitoring device to monitoring device.

When a synchronization signal 108 is generated by the TSD 102, the monitoring devices 104 must be able to: 1) detect the synchronization signal 108, and 2) perform the appropriate operations as configured. In detecting the TSD's synchronization signal 108, a monitoring device 104 must be zero-blind so that the synchronization signal 108 will not be overlooked. In general, more sophisticated monitoring devices, such as monitoring device 104i, are capable of continuously searching for the synchronization signal 108 while performing their other required functions due to the improved performance of their microprocessor(s) and A/D converters. Less sophisticated monitoring devices, such as monitoring device 104b, are more limited in the scope of their capabilities, and may be unable to continuously search for a synchronization signal 108 without certain modifications. Thus, special hardware or firmware/software filters may be incorporated into the monitoring device so that the monitoring device can detect and interpret the synchronization signal without adversely impacting its other monitor operations. An exemplary implementation that can be incorporated into the firmware/software 304a of a low-end monitoring device 104i is a Goertzel filter. Goertzel filters can efficiently locate a known frequency without performing full-blown spectral analysis of the power signal. The improved efficiency provided by a Goertzel filter will allow a low-end monitoring device 104i to continuously search (zero-blind) for the TSD signal while still being able to perform its other intended functions. Goertzel filters, once tuned to monitor a particular frequency (e.g., the fourth harmonic frequency of the fundamental frequency), can distinguish a signal's magnitude, phase and duration, so even the low-end monitoring devices can receive a discrete number of synchronization signals 108 that are encoded with more than one piece of information. By varying the magnitude, phase and/or duration of the synchronization signal 108, any number of types of information may be encoded into the signal 108. Alternately, a discrete Fast Fourier Transform (FFT) may be employed instead of a Goertzel filter to detect and analyze the synchronization signal 108 in the frequency domain.

Once the monitoring device 104 detects the synchronization signal 108, it must then be able to interpret the signal 108. Pulses 108 may be generated by the TSD 102 and received by the monitoring device 104 in both series (using single frequency) and parallel (using multiple frequencies). Both the monitoring device 104 and the TSD 102 may be configured to operate with both single and multiple-frequency signals 108. A common default configuration for both the TSD 102 and all monitoring devices 104 can be incorporated to minimize conflicting configurations. Conflicting configurations between the TSD 102 and each specific monitoring device 104 can be detected at each specific monitoring device 104 based on the content of the synchronization signal 108. The TSD 102 may also be configured to support multiple functions for multiple specific monitoring devices 104 by time shifting the generated signals 108 or using a different frequency, magnitude, phase and/or duration for each specific function.

The synchronization signal 108 received by each monitoring device 104, depending upon its capabilities (e.g., external communications and on-board clock), is interpreted by the TSD algorithm 306 to provide any combination of the following features (in no particular order):

1. Time of day (TOD)—The time of day feature allows the price rate structure to change depending upon the time of day (e.g., during the high power demand periods of the day the price rate is higher than during the low power demand periods of the day). By leveraging both the synchronization signal 108 and the cycle count within a monitoring device 104, that monitoring device will be able to provide some level of timekeeping/time-stamping, even without an on-board clock. Timekeeping/time-stamping can be implemented for both energy-related and power quality-related data. Although a primary purpose of this feature is to provide timekeeping/time-stamping for monitoring devices without on-board clocks, it works best when the electrical grid frequency is relatively uniform.

2. Time of use (TOU)—The time of use feature allows the price rate structure to change depending upon the time of use. For example, one rate may be applied to energy usage from 12-2 pm, but a different rate applied to energy usage from 2-4 pm. This feature leverages the same principles outlined in "Time of Day" feature above. Monitoring devices (such as monitoring device 104b) without on-board clocks are able to perform some level of timekeeping/time-stamping, from which TOU can be determined.

3. Shift energy—The shift energy feature allows the price rate structure to change depending upon the energy consumed during a pre-configured work shift (e.g., 9 am-5 pm shift, 5 pm-1 am shift, and so forth). This feature leverages the same principles outlined in "Time of Day" feature above. Once the TSD 102 provides a monitoring device 104b without an on-board clock a time reference, energy shifts costs can be determined based on the pre-configured work shift. The number of cycles can then be counted with respect to the synchronization signal 108 in a specific monitoring device 104, and the shifts accounted for accordingly.

4. Number of 9s—The reliability in "Number of 9s" can be ascertained by determining the number of missing cycles that should have been counted during a predetermined time period (e.g., a year). For example, for a 60 Hz fundamental frequency, a monitoring device can expect to count 60 cycles per second, or 3600 cycles every minute, and so forth. In a 24-hour period, the monitoring device should count 5,184,000 cycles assuming a 60 Hertz nominal frequency. In an average one-year period, the monitoring device may count 1,893,456,000 cycles (assuming 365.25 days per year and a 60 Hertz nominal frequency). Of course, other one-year cycle totals are possible. If the monitoring device counted 1,893,400,000 cycles when it expected to count 1,893,456,000 cycles, the reliability during that one year period would be 99.99%, and the number of nines would be four. Because the number of cycles experienced over the course of a year will vary depending upon the utility, the number of outages experienced by the monitoring device will also be considered.

5. Load times—Monitoring devices, even those without on-board clocks, can determine load activity and times by the principles stated above. Correlating load changes with the simulated clock (based on cycle counts and the synchronization signals 108) will provide the end-user with reasonable information and statistics related to load operation.

6. Date/time-stamping of events—When an event (e.g., any anomaly on the power system 100 that causes the voltage or current on the conductor 110 to vary from their fundamental waveform, such as a disturbance) occurs on the power system 100, and that event is perceived and quantified by the monitoring device, the date and/or time of the event can be recorded or logged by the monitoring device 104. For example, if a synchronization signal is received at time X (say, midnight), and 3,600 cycles later an event occurs, the time of the event would be recorded as 12:01 am.

7. Number of disturbances and outage times—The controllers in low-end monitoring devices (such as monitoring device 104b) may be programmed to detect a loss of control power. By evaluating the cycle count in a monitoring device 104 as it relates to the loss of control power, even a monitoring device 104b without an on-board clock can provide some level of time-stamping for an outage's occurrence (see FIG. 5). The number of outages can be determined by counting the number of times control power was lost.

Figure 5:
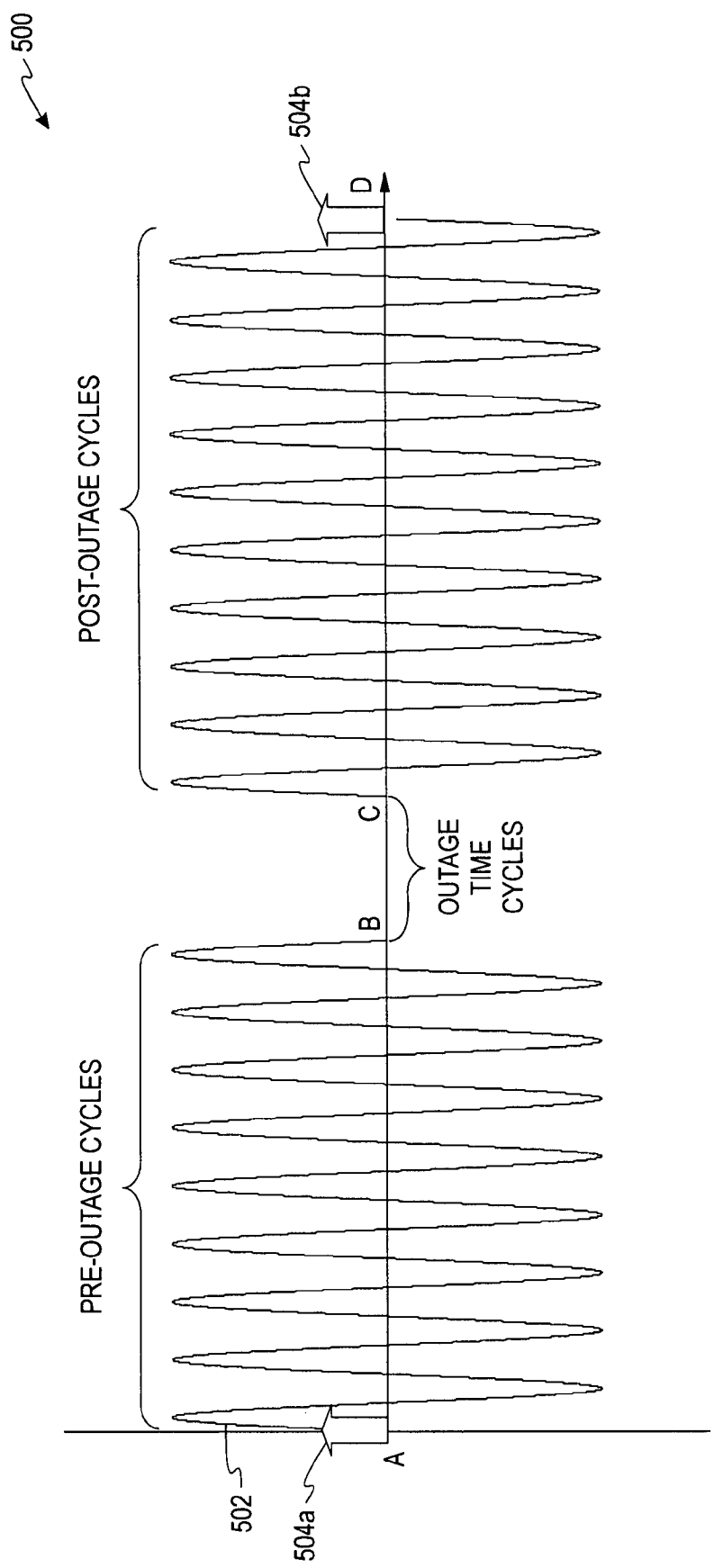
FIG. 5 illustrates an exemplary waveform of a fundamental signal with two synchronization signals injected at times A and D and a power outage at times B and C according to a specific aspect of the present invention.
Figure 6:
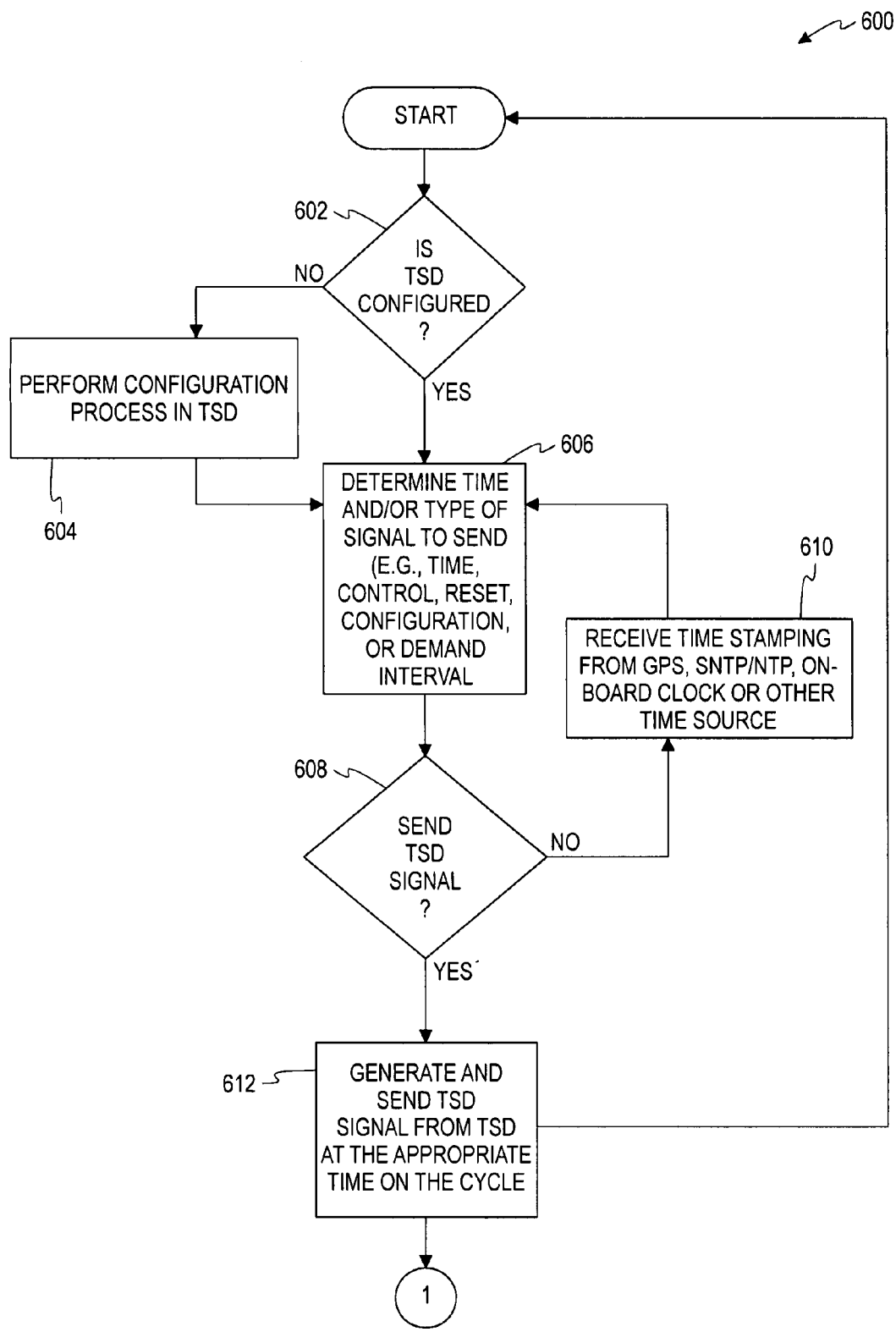
FIGS. 6 and 7a-7i illustrates an exemplary flow chart diagram of steps or acts carried out by the TSD and/or a capable monitoring device according to aspects of the present invention.

For example, in FIG. 5, a synchronization signal 504a is received at time A, and the monitoring device 104 begins to count the number of cycles 502, until an outage occurs between time B and C. When power is sensed again at time C, the monitoring device continues to count cycles. When a synchronization signal 504b is received at time D, the monitoring device can determine the approximate length of the outage time B-C by subtracting the number of counted pre- and post-outage cycles from the total number of cycles expected during the time interval A-D. Comparing the expected cycle count to the actual cycles counted between synchronization signals 108 can provide even more information on the length of an outage event.

For example, the monitoring device 104 can determine the approximate time the outage event occurred by counting the number of cycles between time A and B and converting those count cycles into time based on the fundamental frequency (typically 60 Hz). By then counting the number of cycles until the next synchronization signal 504b, the monitoring device 104 can also determine the time the outage event expired by subtracting the post-outage cycle count from time D and converting it into a corresponding time.

There are also methods to evaluate outages that overlap synchronization signals 108. For example, if cycle count in a monitoring device 104 significantly exceeds the expected number during a time interval and the monitoring device experienced a loss of control power, a synchronization signal 108 was likely missed due to an outage. If a synchronization signal is transmitted every 24 hours, and the monitoring device has counted cycles that correspond to 44 hours, a synchronization signal could have been transmitted during an outage and not perceived by the monitoring device. In that case, the monitoring device can determine the approximate total length of the outage by finding the difference between the actual cycles counted and the expected total number of cycles during the 48-hour period. The beginning outage time can be determined based on the number of cycles counted after a synchronization signal 108. The ending outage time can be determined based on the number of cycles counted before the next detected synchronization signal 108.

8. Time synchronization for all meters (including DST)—Synchronizing time between all capable monitoring devices can be accomplished in accordance with aspects of the present invention because all capable monitoring devices will receive the synchronization signal 108 simultaneously. No latencies exist because the signal 108 is coupled onto the power conductors 110, and travels at the speed of light to every device coupled to the power system 100. While there may be differences in the firmware on each monitoring device, any latencies due to firmware will be negligible at worst and irrelevant in most cases with respect to time synchronization. When the TSD 102 sends out a synchronization signal 108, the TSD firmware 306 in each capable monitoring device 104 ensures simultaneous adjustment. Daylight savings time (DST) is managed by the TSD 102. In the event of daylight savings time (DST), the 24-hour signal from the TSD will come either one hour sooner or one hour later than would otherwise be expected. The monitoring devices 104 will adjust their time according to the TSD's 24-hour signal and reset their cycle counters accordingly.

9. Alignment of data between meters using cycle counts—In an implementation, one synchronization signal 108 from the TSD 102 is detected by all capable monitoring devices on the power monitoring system 100 and each monitoring device marks the cycle when the signal 108 was received. Because their cycle counters will reset to the same cycle, their monitored electrical data is aligned. All electrical data monitored by a monitoring device thereafter will inherently be aligned with respect to all other electrical data monitored by all other capable monitoring devices. There is no need for any manual data alignment or for the monitoring system software to align any data because it already arrives from all monitoring devices with a common time reference (e.g., the cycle count).

10. Clock based on synchronization signals and cycle counts—This feature is based on the same principles outlined in "Time of Day" feature above. Coarser resolution is determined by synchronization signals 108, and finer resolution is determined by cycle counts. Either or both types of resolution can be adapted in a monitoring device 104. All monitoring devices 104 include a cycle counting algorithm, so are capable of time synchronizing their data based upon synchronization signal periodicity or cycle-count periodicity.

11. Time error correction based on synchronization signals and cycle counts—On-board clocks can drift based on a number of factors including temperature, precision, electromagnetic interference, software anomalies, and the like. The TSD 102 can provide a "universal" time for all capable monitoring devices 104. The cycle counts counted by the monitoring devices 104 can ensure that the monitored data is aligned accordingly, even if the on-board clock has drifted. Clock skew is minimized because the synchronization signal 108 from the TSD 102 travels at the speed of light, and is received through the phase inputs (not the communication inputs, which, together with the protocol firmware and drivers, are more susceptible to clock drift). Thus, propagation delays that plague existing systems are effectively eliminated. Clock drift can be corrected in discrete monitoring devices. Furthermore, the tendency of each discrete monitoring device's on-board cloak to drift can be accurately modeled and calibrated.

12. Time redundancy (software, SNTP/NTP, TSD, GPS, etc.)—Devices with on-board clocks have redundancy from the synchronization signal 108. Again, the signal 108 may be referenced to an on-board clock 124, the system software, NTP/SNTP 126, GPS 136, etc. Monitoring devices 104 that have external communications capability but no on-board clock (such as monitoring device 104*a*) have redundancy from the synchronization signal 108 and through manipulation of time registers in the monitoring device 104*a* via the communications link 310*a*.

13. Minimize effects of hardware processing time delays—Because the synchronization signal 108 is injected into the monitoring device 104 through the phase connections 302 and not through a communications link, propagation latencies are effectively eliminated.

Turning now to FIGS. 6 and 7*a-i*, a flow chart diagram of an exemplary synchronization algorithm 600 that is carried out in the TSD 102 and the monitoring devices 104 using the power conductors 110 as a communications medium, as the case may be, is shown diagrammatically. The algorithm 600 may be stored in the software or firmware 125 on the TSD 102 or monitoring devices 104, as the case may be. The algorithm 600 includes functions that may be carried out by the TSD 102 (such as the functions shown in FIG. 6) or the monitoring device 104 or both. It should be emphasized that the algorithm 600 includes multiple algorithms, at least one of which is carried out by the TSD 102 and at least one of which is carried out by the monitoring device 104.

The algorithm 600 determines whether the TSD 102 is configured (602). If not, the TSD 102 is configured (604). The TSD 102 determines the time from its on-board clock 124 or from an external input 126, 128 and/or determines the type of signal to send, such as a time, control, reset, configuration, or demand interval signal (606). The algorithm 600 checks whether a synchronization signal 108 needs to be sent based upon the configuration of the TSD 102 (608). For example, the TSD 102 may be configured to send a TSD signal 108 every hour on the hour. If a TSD signal 108 need not be sent at that particular time, the TSD 102 optionally stores a time stamp along with its cycle count (610) and continues to poll whether it needs to send a synchronization signal (606, 608) based on its configuration.

Figure 7A:
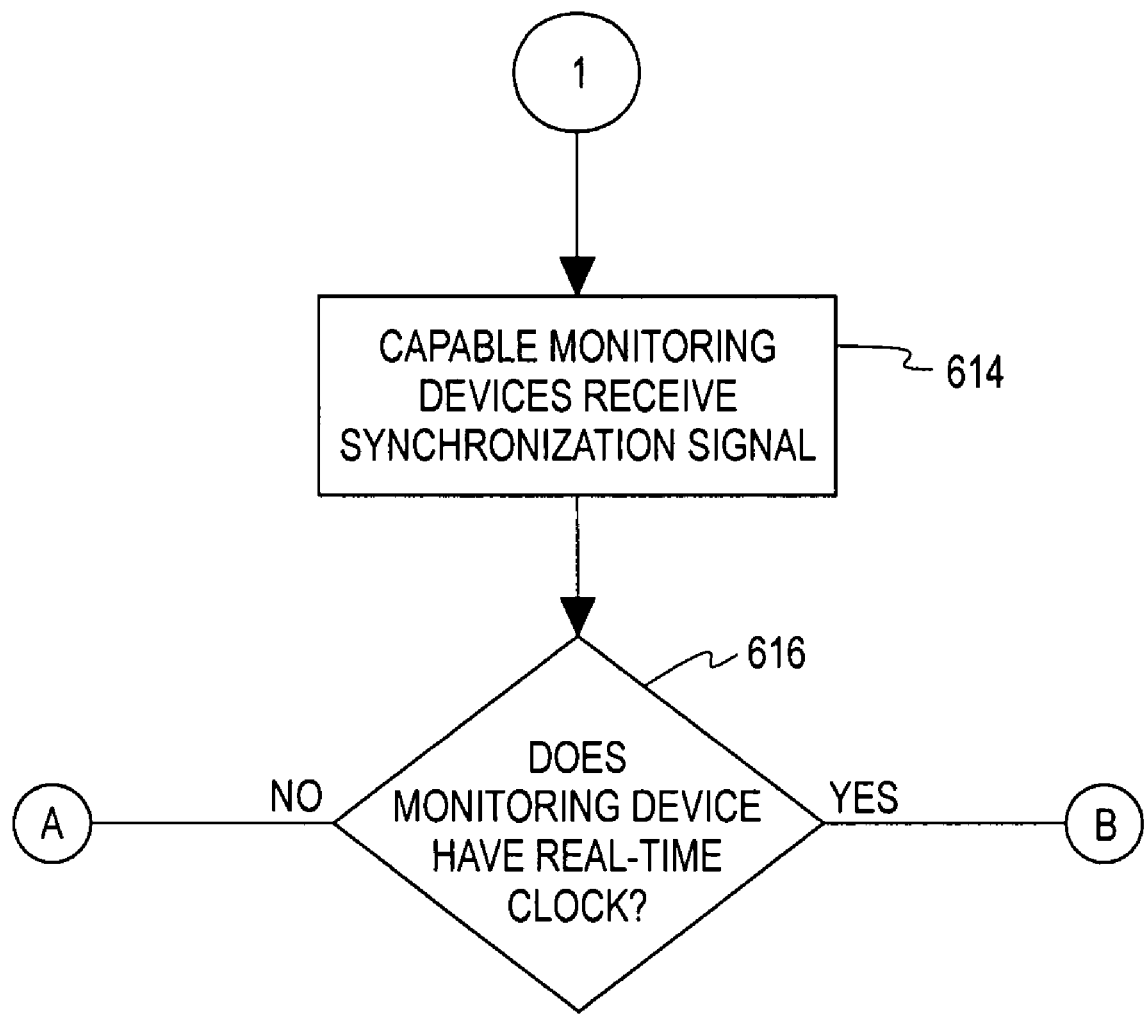
Figure 7B:
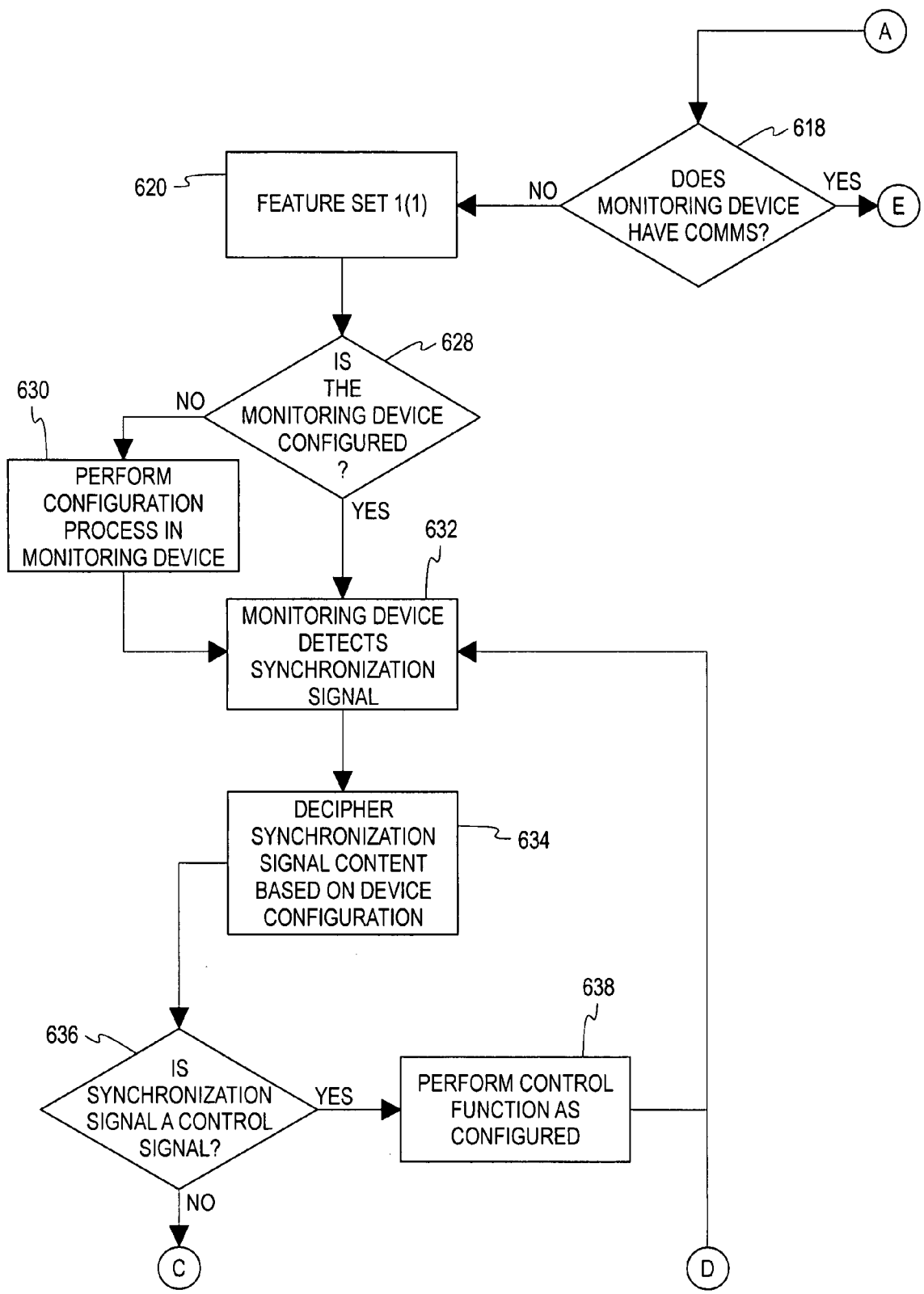
Figure 7C:
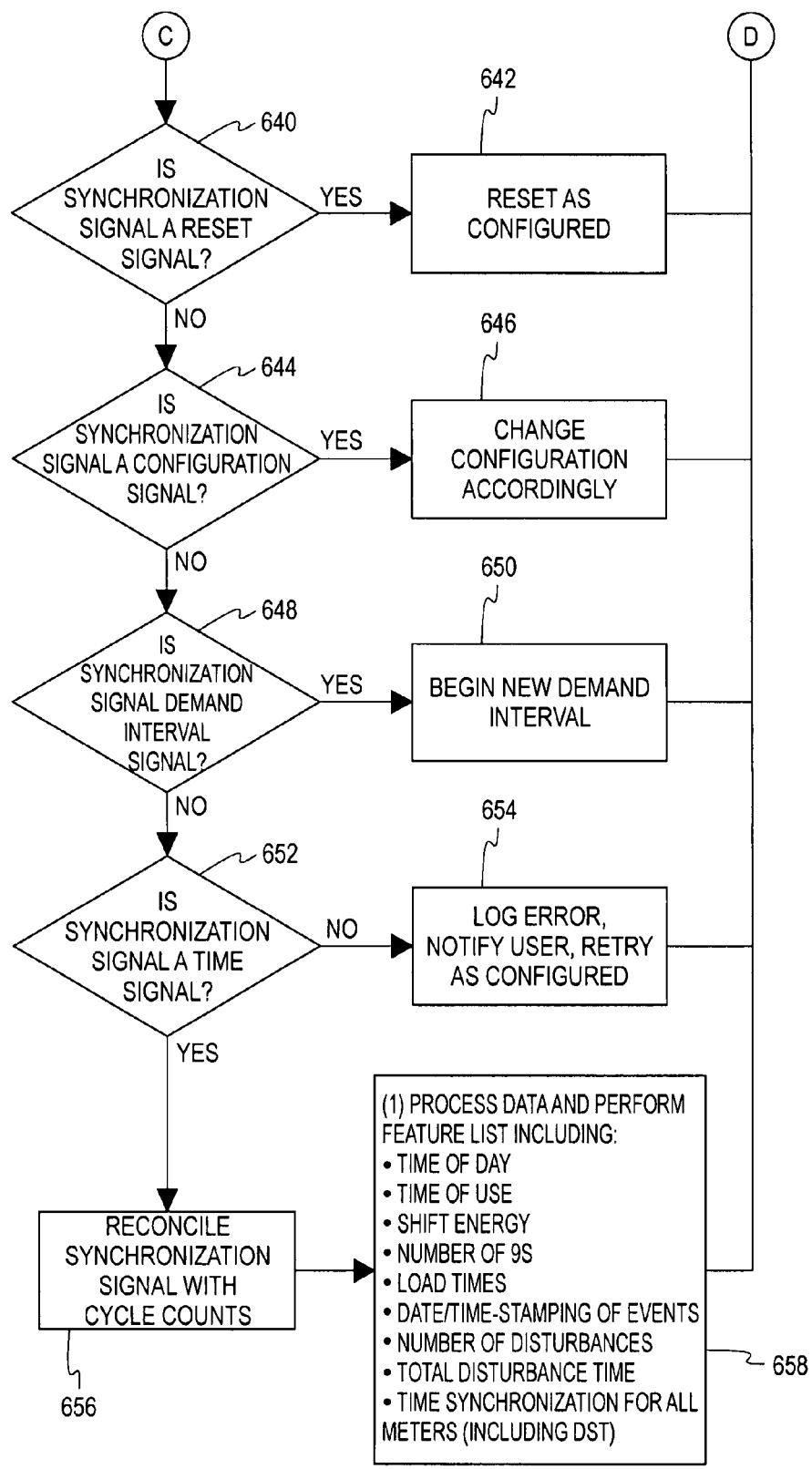

Based on its configuration, the TSD 102 generates and sends a synchronization signal 108 via its signal generation circuit 112 at the appropriate time and phase on the cycle, e.g., 180 degrees phase (612). The injection or coupling of the TSD signal 108 onto the power conductors 110 is described in above in more detail. Capable monitoring devices 104 receive the TSD signal 108 (614) as described in more detail above. The firmware of the monitoring device 104 determines whether it has an on-board real-time clock (616). The firmware determines whether the monitoring device 104 has communications capability (618) (FIG. 7*b*). If not, the algorithm loads Feature Set 1 (620).

Blocks 628-656 shown in FIGS. 7*b*-7*i* are referred to collectively as the Synchronization Analysis Module ("SAM"), which is stored in respective memory devices of the monitoring devices 104. Once the feature set (620, 622, 624, 626) is determined for a specific monitoring device 104, the algorithm 600 carries out the functions, steps, or actions set forth in the SAM (628-656). Those are described in more detail next.

The SAM determines whether the monitoring device is configured (628), and, if not, configures the monitoring device (630). Once the monitoring device is configured, the monitoring device 104 detects the synchronization signal 108 as described above (632). The monitoring device 104 deciphers the content of the synchronization signal 108 as described above, based on the configuration of the monitoring device 104 (634). The SAM determines whether the synchronization or TSD signal 108 is a control signal (636), a reset signal (640), a configuration signal (644), a demand interval signal (648), or a time pulse (652).

If the TSD signal 108 is a control signal (636), the SAM performs the control function in the monitoring device 104 as configured (638). The control function may be performed based on the TSD signal 108. The control function may be performed immediately or later based on the time relative to cycle counts and the configuration. Examples of a control function include the monitoring device 104 instructing a device (such as a load, e.g., a lighting device) to be turned on or off or to open or close a circuit breaker. If the TSD signal 108 is a reset signal (640), the monitoring device 104 resets registers, components or the device as configured (642). For example, the monitoring device 104 may reset an energy register, an accrued value, itself, minimum or maximum values, and the like (642). Any register or value may be reset (e.g., to zero) or a component on the monitoring device 104, such as its on-board clock if available may be reset (642). Alternately, the monitoring device 104 itself may be reset in response to a reset signal (642). If the TSD signal 108 is a configuration signal, the monitoring device 104 changes its configuration accordingly (646). If the TSD signal 108 is a demand interval signal (648), the monitoring device 104 begins a new demand interval (650). If the TSD signal 108 is a time signal (652), the monitoring device 104 reconciles the TSD signal 108 with the cycle counts in its counter (656). The reconciliation may include adjusting the cycle count (such as resetting it or adding/subtracting values from the monitoring device's cycle count) or on-board clock based on the time reference, determining an outage duration or outage time, or determining a disturbance time. If the TSD signal 108 is none of the above types of signals (652), the monitoring device 104 logs an error, optionally notifies a user via its communications interface, and may retry to receive the TSD signal 108 if configured to do so (654).

Upon reconciliation (656), the monitoring devices perform any or all of the functions in Feature Set 1, which include Time of Day, Time of User, Shift Energy, Number of 9s, Load Times, Date/Time-Stamping of Events, Number of Disturbances, Total Disturbance Time, and Time Synchronization for All Meters (Including DST) (658). These features are described above. The SAM continues to poll for a synchronization signal (632).

Figure 7D:
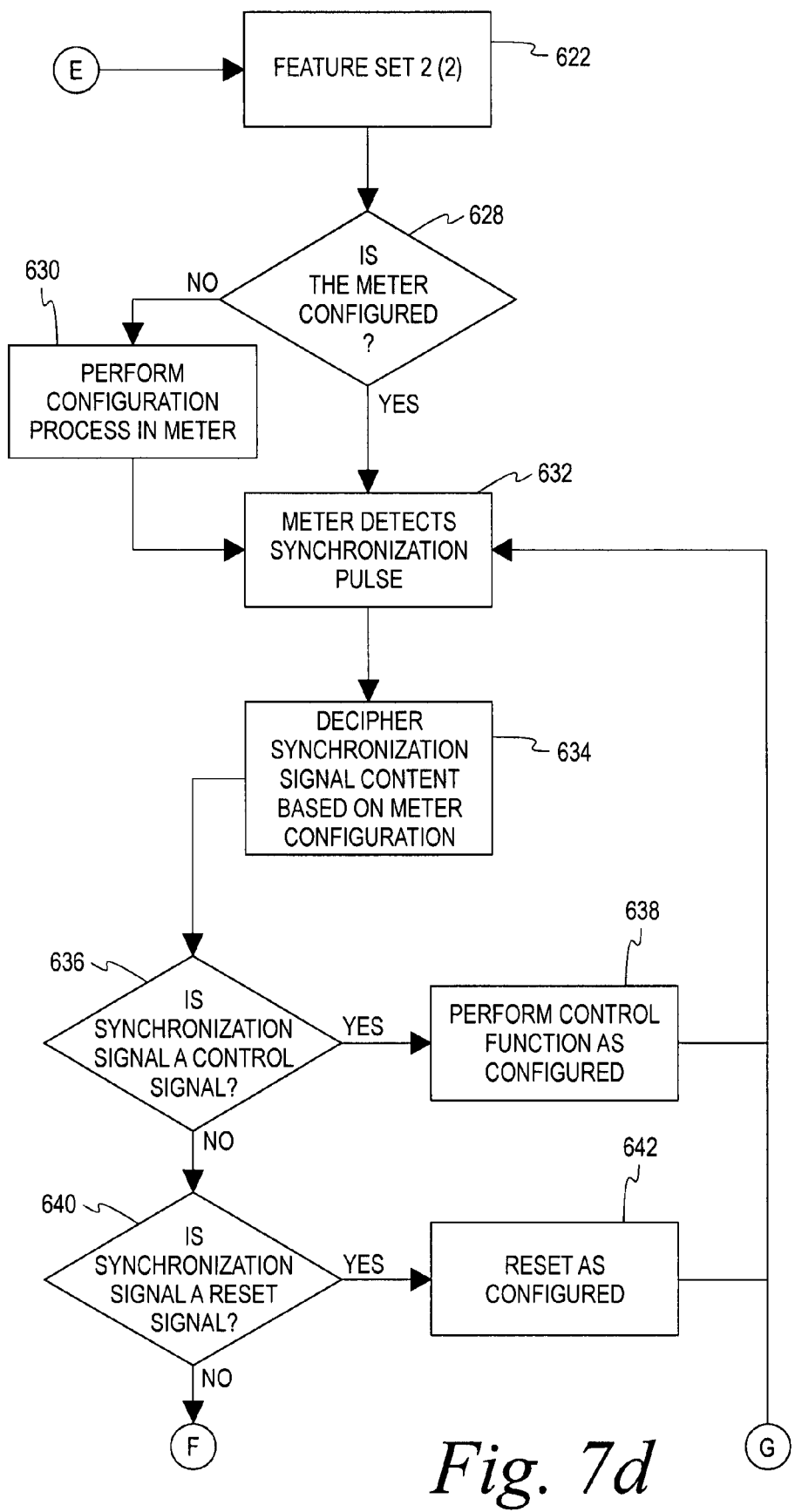
Figure 7E:
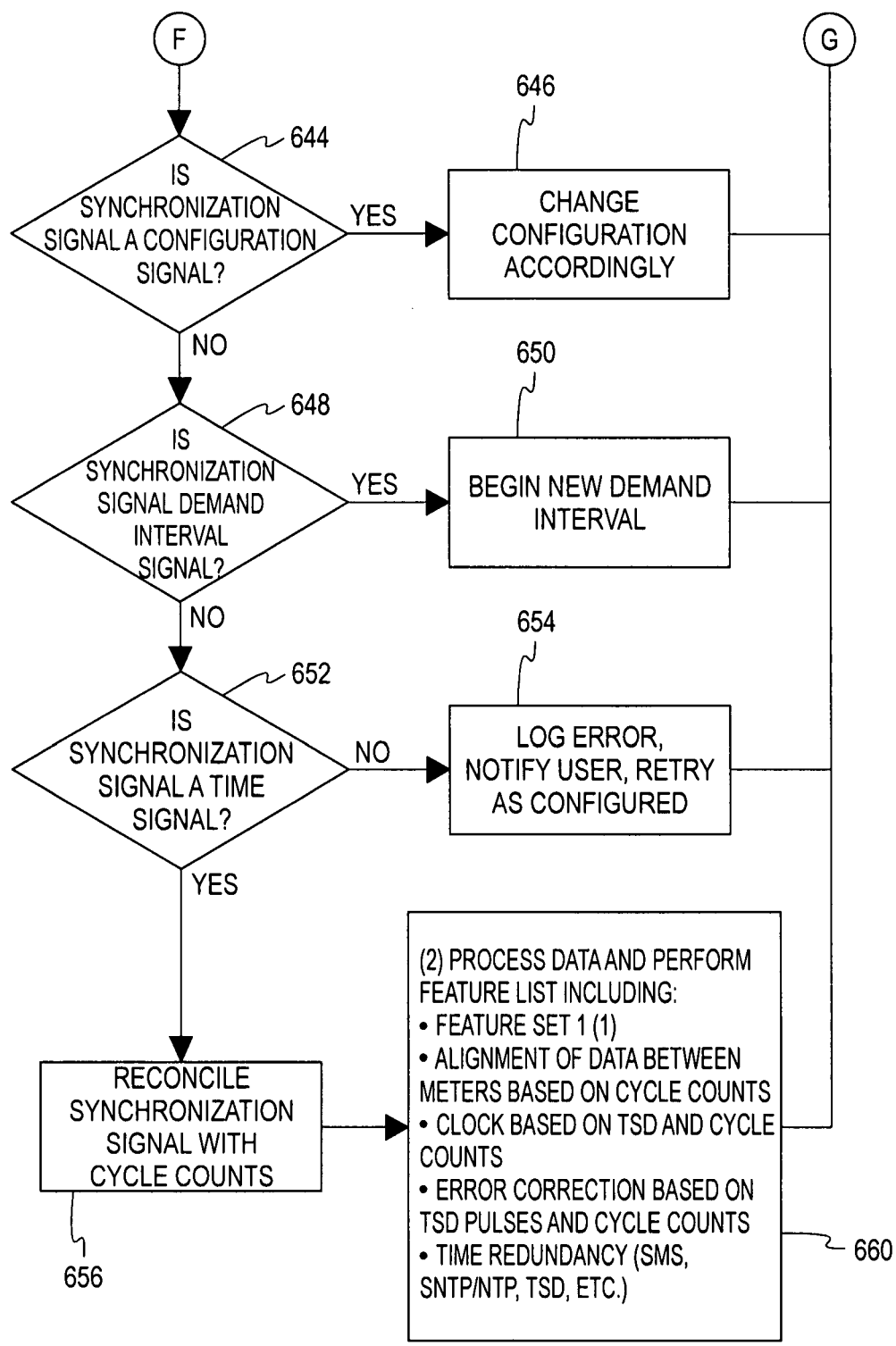

If the monitoring device 104 has communications capability (618), the algorithm 600 loads Feature Set 2 (622), and carries out the functions of the SAM module (628-656) (FIGS. 7*d*-7*e*). Upon reconciliation of the TSD signal 108 (656), the algorithm 600 carries out Feature Set 1 as well as: alignment of data between monitoring devices based on cycle counts; clock based on TSD and cycle counts; error correction is based on TSD signals and cycle counts; and time redundancy (SMS, SNTP/NTP, TSD, etc.) (660). The SAM continues to poll for a synchronization signal (632).

Figure 7F:
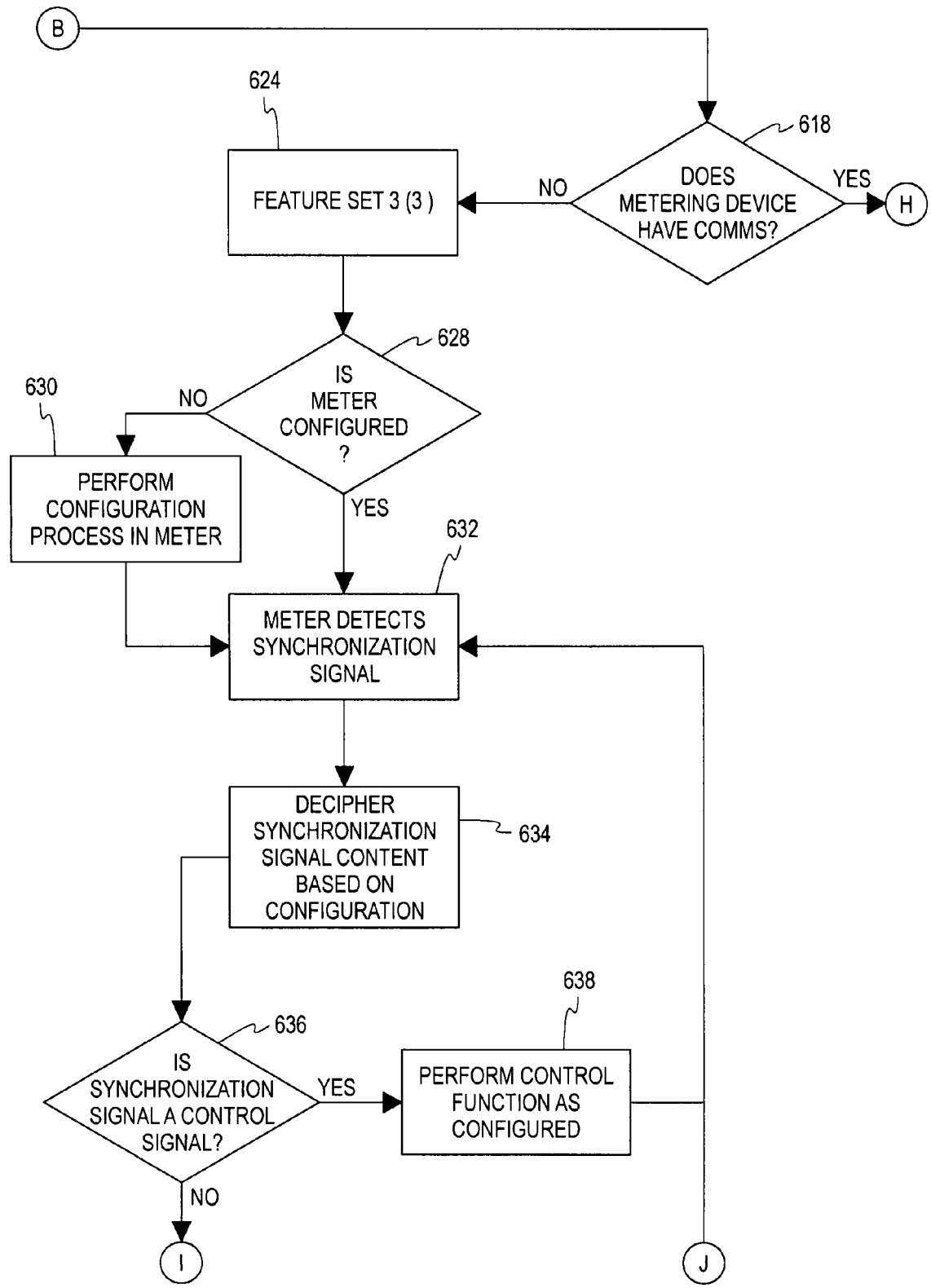
Figure 7G:
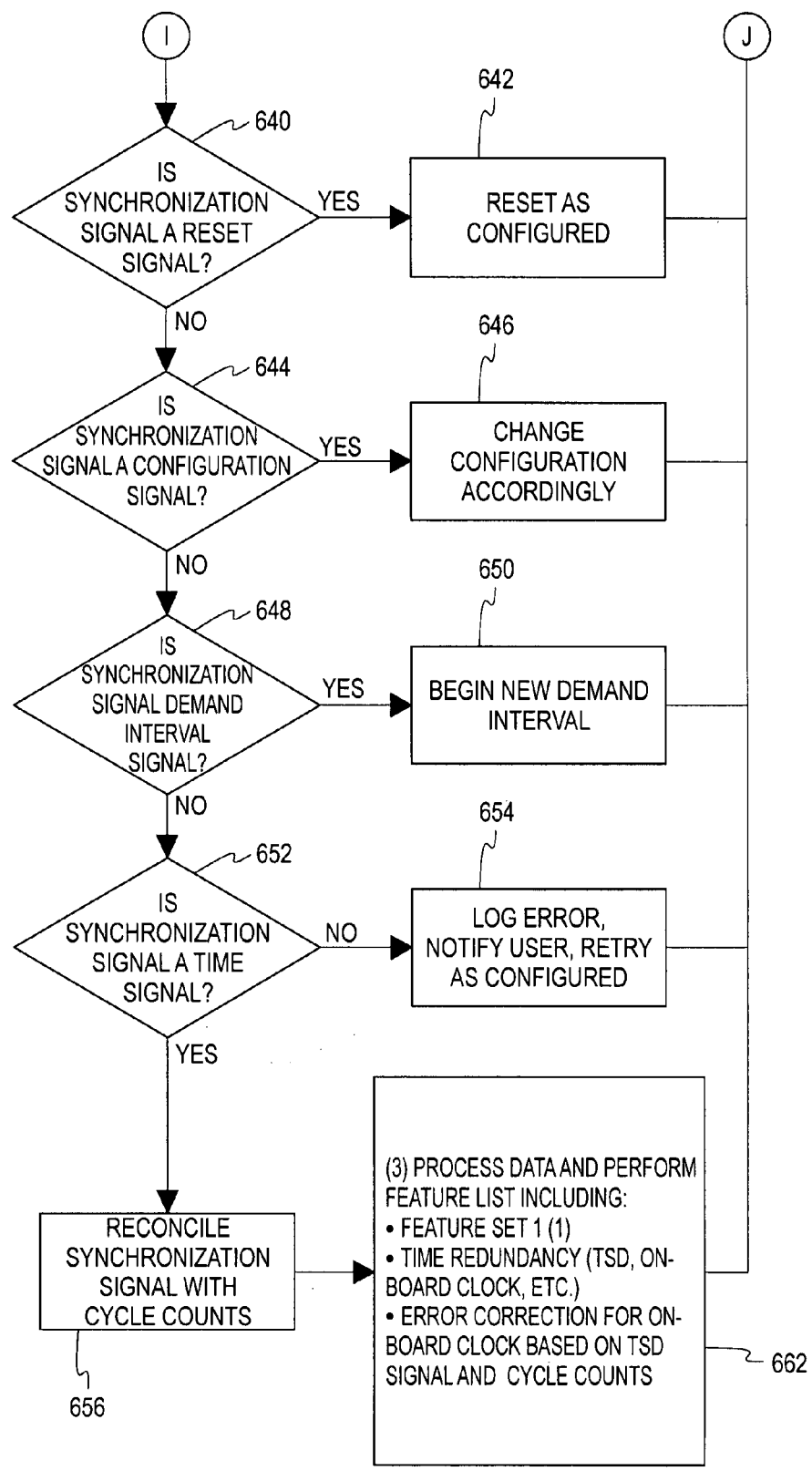

If the monitoring device 104 has a real-time clock (616), the firmware of the monitoring device 104 determines whether it has communications capability (618). If not, the algorithm 600 loads Feature Set 3 (624) and carries out the functions of the SAM module (628-656) (FIGS. 7f-7g). Upon reconciliation of the TSD signal 108 (656), the algorithm 600 carries out Feature Set 3, which includes Feature Set 1 and the following additional features: time redundancy (STD, on-board clock, etc.), and error correction for on-board clock based on TSD signals 108 and cycle counts (662). The SAM continues to poll for a synchronization signal (632).

Figure 7H:
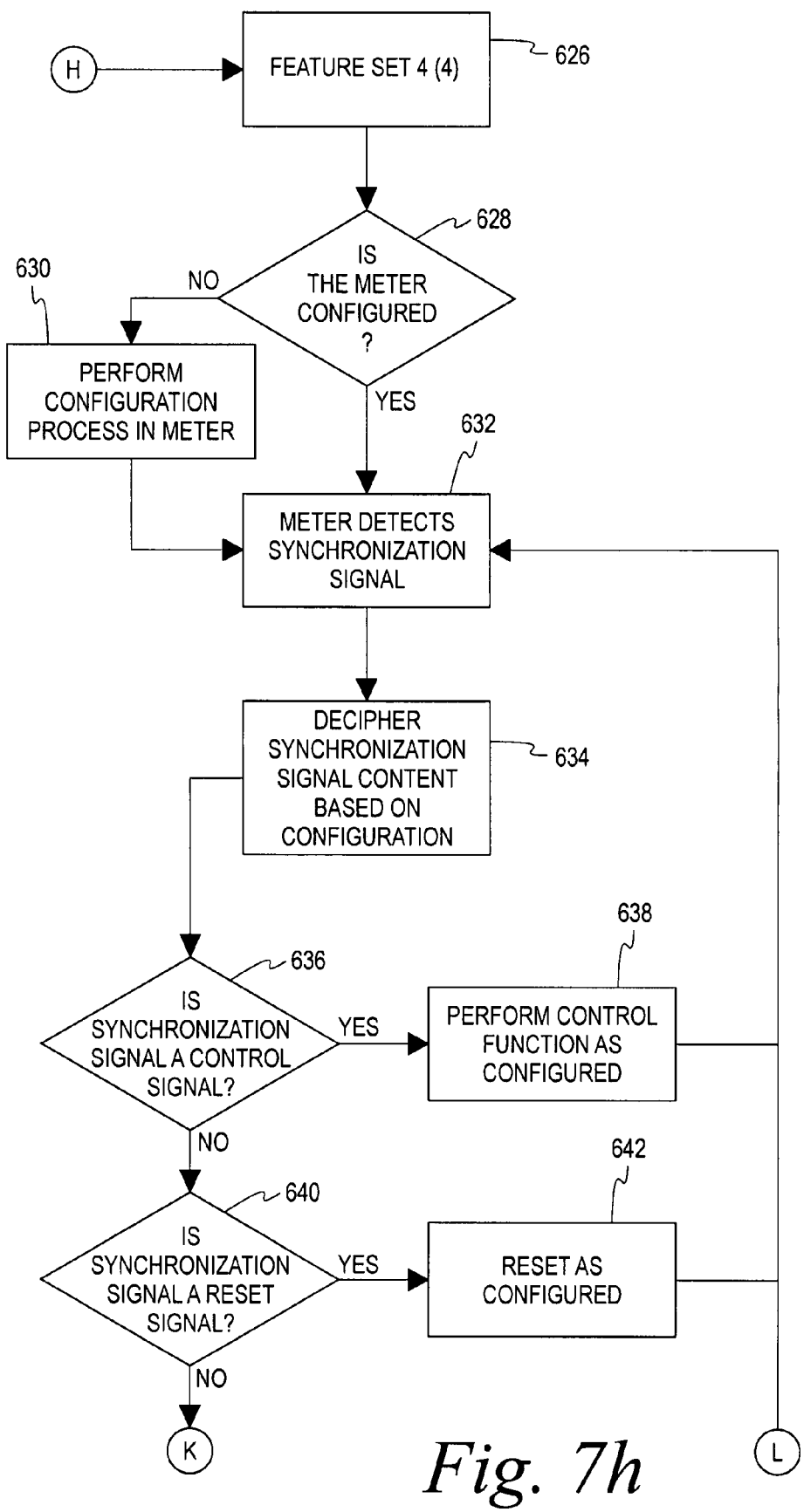
Figure 7I:
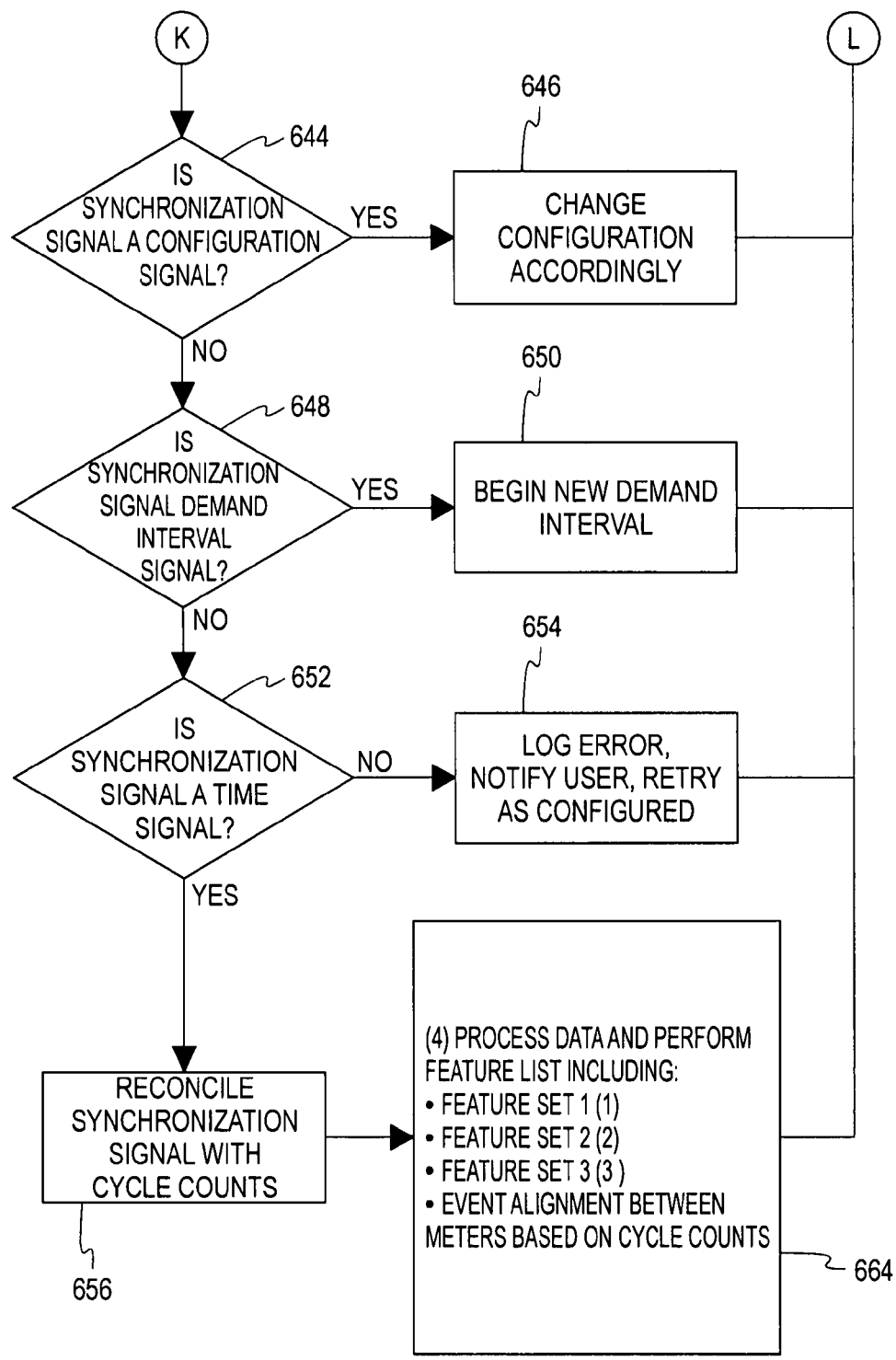

If the monitoring device 104 has a real-time clock (616) and communications capability (618), the algorithm 600 loads Feature Set 4 (626), and carries out the functions of the SAM module (628-656) (FIGS. 7h-7i). Upon reconciliation of the TSD signal 108 (656), the algorithm 600 carries out Feature Set 4, which includes Feature Set 1, Feature Set 2, Feature Set 3, as well as even alignment between monitoring devices based on cycle counts (664). The SAM continues to poll for a synchronization signal (632).

In addition to the above-mentioned benefits, addition benefits of aspects of the present invention include:
1. Adds non-existent capabilities (both power quality and energy-related) to low-end monitoring devices.
2. Has a lower overall cost compared to other currently available techniques and systems, such as those employing external GPS systems.
3. Enhances the capabilities of existing medium/high-end monitoring devices.
4. Reduces installation costs.
5. Reduces maintenance costs.
6. Existing monitoring devices (particularly low-end meters) can be configured to receive the synchronization signal 108 by a simple firmware upgrade.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for synchronizing a plurality of monitoring devices in a power system to a common time reference, comprising:
a time synchronization device that includes a reference clock, a signal generator, and a first controller programmed to cause the signal generator to generate a synchronization signal at periodic time intervals that are synchronized with the reference clock, the signal generator coupling the synchronization signal over an energized power conductor carrying a current or voltage that oscillates at a fundamental or nominal frequency of the power system, the synchronization signal being distinct from the current or voltage carried by the energized power conductor and having a frequency greater than the fundamental or nominal frequency of the power system and a magnitude that exceeds a noise floor associated with the power system; and
a monitoring device coupled to the energized power conductor, the monitoring device including a detection module that detects the current or voltage carried by the energized power conductor, a communications interface communicatively coupled to a remote system that is remote from the monitoring device and the time synchronization device, and a second controller coupled to a memory, electrical data indicative of the detected current or voltage being stored in the memory, the second controller being programmed to:
detect at least the frequency or the magnitude of the synchronization signal and, in response thereto, to store data in the memory indicative of the detection of the synchronization signal;
synchronize the electrical data with the reference clock by adjusting a time of an on-board clock or a cycle counter in the monitoring device responsive to the detected synchronization signal; and
transmit, via the communications interface, the synchronized electrical data to the remote system.

2. The system of claim 1, wherein the monitoring device is a power meter and further includes the cycle counter that counts a number of cycles on the energized power conductor, the cycle counter incrementing a value in the memory, the data being set to a predetermined value in response to the detection of the synchronization signal.

3. The system of claim 1, wherein at least on characteristic of the synchronization signal is at least one of a fundamental frequency, a magnitude, a phase, or a duration, the signal generator operable to generate the synchronization signal and a second synchronization signal having a set of characteristics in which at least one characteristic of the set of characteristics differs from the at least one characteristic of the synchronization signal.

4. The system of claim 3, wherein the fundamental frequency of the synchronization signal corresponds to a harmonic component of the fundamental frequency of the voltage or current.

5. The system of claim 1, wherein the reference clock is generated from a calendar clock onboard the time synchronization device.

6. The system of claim 1, wherein the reference clock is generated from an external global positioning system.

7. The system of claim 1, wherein the monitoring device is a power meter and further includes the cycle counter that counts a number of cycles on the energized power conductor, and wherein the data indicative of the detection of the synchronization signal includes a time associated with the detection of the synchronization signal and the cycle count associated with the detection of the synchronization signal.

8. The system of claim 1, wherein the synchronization signal includes a plurality of pulses, the monitoring device converting the plurality of pulses to a corresponding digital word indicative of at least a control function, a reset function, a configuration function, or a utility demand interval function.

9. The system of claim 8, wherein the control function includes at least one of an instruction that causes a load coupled to the monitoring device to be turned on or off, or an instruction that causes an actuating device coupled to the monitoring device to change states.

10. The system of claim 8, wherein the reset function includes at least one of an instruction to adjust a counter or value related to an electrical characteristic or an instruction to reset the monitoring device.

11. The system of claim 8, wherein the configuration function includes an instruction to configure a parameter of the monitoring device, the parameter including a value indicative of at least on characteristic of the synchronization signal.

12. The system of claim 8, wherein the utility demand interval function includes an instruction to increment or reset a utility demand interval counter.

13. A method of communicating a synchronization signal that is interpreted simultaneously by a plurality of monitoring devices in a power system, comprising:

generating a synchronization signal having at least a frequency, a magnitude and a duration;

coupling the synchronization signal via power line communication (PLC) onto one or more power conductors to which the plurality of monitoring devices are coupled at periodic time intervals that are determined by a reference clock external to the plurality of monitoring devices, the one or more power conductors carrying a current or voltage oscillating at a fundamental or nominal frequency of the power system, the synchronization signal being distinct from a current carried by the one or more power conductors, wherein the frequency of the synchronization signal is greater than the fundamental or nominal frequency and the magnitude of the synchronization signal exceeds a noise floor associated with the power system;

monitoring, by each of the plurality of monitoring devices, a characteristic associated with the current or voltage carried by the one or more power conductors to which each of the plurality of monitoring devices is coupled, and storing the monitored characteristic as corresponding electrical data in a respective memory of each of the plurality of monitoring devices;

receiving, simultaneously at each of the plurality of monitoring devices, the synchronization signal from the one or more power conductors;

detecting at least the frequency or the magnitude of the synchronization signal;

responsive to the detecting, storing in the memory of each of the plurality of monitoring devices, data indicative of the detection of the synchronization signal;

synchronizing the respective electrical data from each of the plurality of monitoring devices with the reference clock by adjusting a time of an on-board clock or a cycle counter in at least one of the plurality of monitoring devices responsive to the detected synchronization signal; and receiving, in a remote system, the synchronized electrical data from each of the plurality of monitoring devices.

14. The method of claim 13, wherein the detecting includes filtering the synchronization signal at a harmonic component of the fundamental frequency of the voltage or current in the one or more power conductors.

15. The method of claim 13, further comprising encoding in the synchronization signal at least one of control information, reset information, configuration information, or utility demand interval information, the synchronization signal comprising a plurality of pulses transmitted in a sequence that is decoded and converted into a corresponding digital word by each of the plurality of monitoring devices.

16. The method of claim 13, wherein the storing includes adjusting an on-board clock in at least one of the plurality of monitoring devices to be synchronized with the reference clock.

17. The method of claim 13, further comprising counting, in at least one of the plurality of monitoring devices, a number of zero crossings in the voltage or current in the one or more power conductors and storing the number of zero crossings in a cycle count counter on the at least one of the plurality of monitoring devices, wherein the storing includes resetting the cycle count counter.

18. The method of claim 17, further comprising determining, in at least one of the plurality of monitoring devices, an outage time based on a number of peaks actually counted by the at least one of the plurality of monitoring devices during a time interval between two consecutive synchronization signals and on a number of expected peaks that should have been counted during the time interval.

* * * * *